US011301532B2

(12) United States Patent
Chandra

(10) Patent No.: US 11,301,532 B2
(45) Date of Patent: Apr. 12, 2022

(54) SEARCHING FOR USER SELECTED PORTIONS OF CONTENT

(71) Applicant: Rohit Chandra, Sunnyvale, CA (US)

(72) Inventor: Rohit Chandra, Sunnyvale, CA (US)

( * ) Notice: Subject to any disclaimer, the term of this patent is extended or adjusted under 35 U.S.C. 154(b) by 0 days.

(21) Appl. No.: 17/512,599

(22) Filed: Oct. 27, 2021

(65) Prior Publication Data
US 2022/0043875 A1    Feb. 10, 2022

Related U.S. Application Data

(60) Continuation-in-part of application No. 17/112,544, filed on Dec. 4, 2020, which is a division of application No. 16/406,589, filed on May 8, 2019, now Pat. No. 10,909,197, which is a continuation-in-part of application No. 15/042,977, filed on Feb. 12, 2016, now Pat. No. 10,289,294, which is a continuation-in-part of application No. 13/831,331, filed on Mar. 14, 2013, now Pat. No. 9,292,617, which is a continuation-in-part of application No. 11/766,786, filed on Jun. 21, 2007, now Pat. No. 8,910,060.

(60) Provisional application No. 60/815,467, filed on Jun. 22, 2006.

(51) Int. Cl.
| G06F 17/00 | (2019.01) |
| G06F 16/9535 | (2019.01) |
| G06F 3/04842 | (2022.01) |
| G06F 16/955 | (2019.01) |
| G06F 16/2457 | (2019.01) |
| G06Q 30/02 | (2012.01) |
| G06F 16/9538 | (2019.01) |
| G06F 40/169 | (2020.01) |

(52) U.S. Cl.
CPC ...... *G06F 16/9535* (2019.01); *G06F 3/04842* (2013.01); *G06F 16/24578* (2019.01); *G06F 16/9538* (2019.01); *G06F 16/9562* (2019.01); *G06Q 30/0271* (2013.01); *G06F 40/169* (2020.01)

(58) Field of Classification Search
CPC .......... G06F 16/9535; G06F 3/04842; G06F 16/24578; G06F 16/9538; G06F 16/9562; G06F 40/169; G06Q 30/0271
See application file for complete search history.

(56) References Cited

U.S. PATENT DOCUMENTS

| 5,727,129 | A | 3/1998 | Barett et al. |
| 5,757,371 | A | 5/1998 | Oran et al. |
| 5,802,299 | A | 9/1998 | Logan et al. |
| 5,918,014 | A | 6/1999 | Robinson |
| 5,958,008 | A | 9/1999 | Pogrebisky et al. |

(Continued)

OTHER PUBLICATIONS

Baumgartner et al., Visual Web Information Extraction with Lixto, 2001, VLDB, pp. 1-10. (Year: 2001).*

*Primary Examiner* — Andrew T McIntosh

(57) ABSTRACT

A method, system, and program for searching for a portion content contained in a document is disclosed. Accordingly, a search engine, or some other application, analyzes a document with a user selected content portion to determine a match. The particular algorithm for determining the match will vary depending upon the particular implementation. Based on this analysis, one or more portions of the document are automatically highlighted in situ.

21 Claims, 28 Drawing Sheets

(56) References Cited

U.S. PATENT DOCUMENTS

| | | |
|---|---|---|
| 5,982,370 A | 11/1999 | Kamper |
| 6,009,410 A | 12/1999 | LeMole |
| 6,065,057 A | 5/2000 | Rosen et al. |
| 6,081,829 A | 6/2000 | Sidana |
| 6,088,702 A | 7/2000 | Plantz et al. |
| 6,144,944 A | 11/2000 | Kurtzman, II |
| 6,184,878 B1 | 2/2001 | Alonso et al. |
| 6,199,077 B1 | 3/2001 | Inala et al. |
| 6,230,171 B1 | 5/2001 | Pacifici et al. |
| 6,233,682 B1 | 5/2001 | Fritsch |
| 6,240,444 B1 | 5/2001 | Fin et al. |
| 6,260,192 B1 | 7/2001 | Rosin et al. |
| 6,282,548 B1 | 8/2001 | Burner et al. |
| 6,285,987 B1 | 9/2001 | Roth |
| 6,314,451 B1 | 11/2001 | Landsman |
| 6,339,767 B1 | 1/2002 | Rivette et al. |
| 6,338,117 B1 | 3/2002 | Challenger et al. |
| 6,456,304 B1 | 9/2002 | Angiulo et al. |
| 6,490,602 B1 | 12/2002 | Karaemer |
| 6,493,733 B1 | 12/2002 | Pollack et al. |
| 6,563,913 B1 | 5/2003 | Kahhazian |
| 6,600,503 B2 | 7/2003 | Stautner et al. |
| 6,711,585 B1 | 2/2004 | Copperman et al. |
| 6,769,015 B1 | 7/2004 | Bates et al. |
| 6,804,659 B1 | 10/2004 | Graham et al. |
| 6,850,986 B1 | 2/2005 | Peacock |
| 6,859,909 B1 | 2/2005 | Lerner et al. |
| 7,028,072 B1 | 4/2006 | Kliger |
| 7,085,994 B2 | 8/2006 | Gvily |
| 7,103,848 B2 | 9/2006 | Barsness et al. |
| 7,117,432 B1 | 10/2006 | Shanahan |
| 7,269,787 B2 | 9/2007 | Amitay et al. |
| 7,278,092 B2 | 10/2007 | Krzanowski |
| 7,284,008 B2 | 10/2007 | Henkin et al. |
| 7,315,848 B2 | 1/2008 | Pearse et al. |
| 7,366,979 B2 | 4/2008 | Spielberg |
| 7,506,253 B2 | 3/2009 | Armstrong |
| 7,519,562 B1 | 4/2009 | Vander Mey et al. |
| 7,533,090 B2 | 5/2009 | Agarwal et al. |
| 7,539,656 B2 | 5/2009 | Fratkina et al. |
| 7,603,437 B2 | 10/2009 | Busey |
| 7,693,817 B2 | 4/2010 | Dumais et al. |
| 7,702,811 B2 | 4/2010 | Gopalan et al. |
| 7,792,903 B2 | 9/2010 | Fischer et al. |
| 7,860,895 B1 | 12/2010 | Scofield et al. |
| 7,925,993 B2 | 4/2011 | Williams |
| 7,941,444 B2 | 5/2011 | Cragun et al. |
| 7,996,396 B2 | 8/2011 | Leblang et al. |
| 8,001,105 B2 | 8/2011 | Bolivar et al. |
| 8,020,111 B2 | 9/2011 | Horvitz et al. |
| 8,090,706 B2 | 1/2012 | Bharat |
| 8,131,779 B2 | 3/2012 | Jonker et al. |
| 8,150,824 B2 | 4/2012 | Marmaros et al. |
| 8,180,769 B2 | 5/2012 | Liu et al. |
| 8,195,772 B2 | 6/2012 | Marmor |
| 8,200,662 B2 | 6/2012 | Reitter et al. |
| 8,255,819 B2 | 8/2012 | Chang et al. |
| 8,276,061 B2 | 9/2012 | Joshi et al. |
| 8,631,001 B2 | 1/2014 | Lawrence et al. |
| 8,635,520 B2 | 1/2014 | Christiansen et al. |
| 8,898,585 B2 | 11/2014 | Cragun et al. |
| 8,943,153 B2 | 1/2015 | Lewis et al. |
| 9,141,718 B2 | 9/2015 | Forstall et al. |
| 9,342,602 B2 | 5/2016 | Kraft et al. |
| 9,569,548 B2 | 2/2017 | Patel et al. |
| 9,753,972 B2 | 9/2017 | Mehanna |
| 10,055,104 B2 | 8/2018 | Blain et al. |
| 2001/0000537 A1 | 4/2001 | Inala et al. |
| 2001/0000321 A1 | 10/2001 | Macartney-Filgate |
| 2001/0004204 A1 | 11/2001 | Howard |
| 2001/0044720 A1 | 11/2001 | Lee et al. |
| 2001/0051987 A1 | 12/2001 | Fukumoto et al. |
| 2002/0007379 A1 | 1/2002 | Wang et al. |
| 2002/0023072 A1 | 2/2002 | Stern et al. |
| 2002/0026359 A1 | 2/2002 | Long |
| 2002/0049738 A1 | 4/2002 | Epstein |
| 2002/0059343 A1 | 5/2002 | Kurishima et al. |
| 2002/0059369 A1 | 5/2002 | Kern et al. |
| 2002/0065802 A1 | 5/2002 | Uchiyama |
| 2002/0069296 A1 | 6/2002 | Aua et al. |
| 2002/0076053 A1 | 6/2002 | Hachimura |
| 2002/0129375 A1 | 9/2002 | Kim et al. |
| 2002/0152215 A1 | 10/2002 | Clark et al. |
| 2002/0196273 A1 | 12/2002 | Krause |
| 2003/0025731 A1 | 2/2003 | Chastain et al. |
| 2003/0046148 A1 | 3/2003 | Rizzi et al. |
| 2003/0050927 A1 | 3/2003 | Hussam |
| 2003/0078856 A1 | 4/2003 | Zubi |
| 2003/0081000 A1 | 5/2003 | Watanabe |
| 2003/0145281 A1 | 7/2003 | Thames |
| 2003/0015412 A1 | 8/2003 | Gehlot |
| 2003/0184582 A1* | 10/2003 | Cohen ............... G06F 16/9574 707/E17.12 |
| 2003/0187886 A1 | 10/2003 | Hull et al. |
| 2004/0078757 A1 | 4/2004 | Golovchinsky |
| 2004/0133848 A1* | 7/2004 | Hunt ............... G06F 16/9577 707/E17.121 |
| 2004/0205065 A1 | 10/2004 | Petras et al. |
| 2004/0205541 A1 | 10/2004 | D'Amico |
| 2004/0221006 A1* | 11/2004 | Gopalan ............ G06F 16/9562 715/745 |
| 2004/0225716 A1 | 11/2004 | Shamir et al. |
| 2004/0267815 A1 | 12/2004 | De Mes |
| 2005/0010475 A1 | 1/2005 | Perkowski et al. |
| 2005/0060162 A1 | 3/2005 | Mohit et al. |
| 2005/0086634 A1 | 4/2005 | Bates et al. |
| 2005/0091027 A1 | 4/2005 | Zaher et al. |
| 2005/0000969 A1 | 5/2005 | Koningstein |
| 2005/0160167 A1 | 7/2005 | Cheng et al. |
| 2005/0210393 A1 | 9/2005 | Maeng |
| 2005/0246651 A1 | 11/2005 | Krzanowski |
| 2005/0256866 A1 | 11/2005 | Lu et al. |
| 2006/0004711 A1 | 1/2006 | Naam |
| 2006/0004734 A1 | 1/2006 | Malkin et al. |
| 2006/0023598 A1 | 2/2006 | Babinski |
| 2006/0036565 A1 | 2/2006 | Bruecken |
| 2006/0041625 A1 | 2/2006 | Chen et al. |
| 2006/0048046 A1 | 3/2006 | Joshi et al. |
| 2006/0053365 A1 | 3/2006 | Hollander et al. |
| 2006/0001228 A1 | 6/2006 | Graham |
| 2006/0136451 A1 | 6/2006 | Denissov |
| 2006/0143236 A1 | 6/2006 | Wu |
| 2006/0021231 A1 | 9/2006 | Ellis |
| 2006/0265344 A1* | 11/2006 | Woods ............... G06F 16/9562 |
| 2006/0277621 A1 | 12/2006 | Hoffman et al. |
| 2006/0282336 A1 | 12/2006 | Huang |
| 2006/0282795 A1 | 12/2006 | Clark et al. |
| 2006/0287971 A1 | 12/2006 | Armstrong |
| 2007/0022098 A1 | 1/2007 | Malik |
| 2007/0055926 A1 | 3/2007 | Christiansen et al. |
| 2007/0143345 A1 | 6/2007 | Jones et al. |
| 2007/0157114 A1 | 7/2007 | Bishop et al. |
| 2007/0192314 A1 | 8/2007 | Heggem |
| 2007/0234209 A1 | 10/2007 | Williams |
| 2007/0250582 A1 | 10/2007 | Sidhu et al. |
| 2007/0266342 A1 | 11/2007 | Chang |
| 2007/0288859 A1 | 12/2007 | Vuong et al. |
| 2007/0298399 A1 | 12/2007 | Shao |
| 2008/0016169 A1 | 1/2008 | Kaghazian |
| 2008/0009783 A1 | 4/2008 | Kim |
| 2009/0199083 A1 | 8/2009 | Sar |
| 2009/0327855 A1 | 12/2009 | Le |
| 2014/0310588 A1 | 10/2014 | Bhogal |
| 2017/0249668 A1 | 8/2017 | Delort |

* cited by examiner

FIG. 8

| FILE | EDIT | VIEW | BOOKMARKS | TOOLS | HELP | | |
|---|---|---|---|---|---|---|---|
| ⬅ 🔄 ✖ 🏠 | HTTP://www.mail.com | | | | | | |

INBOX
SENT
SPAM
ARCHIVE

| FROM | SUBJECT | RECEIVED |
|---|---|---|
| JOHN DOE | HIGHLIGHTED EMAIL (I HIGHLIGHTED TEXT OF INTEREST....) | June 12, 2697 |
| GREG SMITH | NEW ADDRESS | June 12, 2697 |

FROM: John Doe     SUBJECT: HIGHLIGHTED EMAIL (I HIGHLIGHTED TEXT OF INTEREST...) — 108

COMMENT: Outlook does not look good for Qualcomm!

110 — TYPE THE NAME OF ANY WEBSITE TO START HIGHLIGHTING NOW!    START HIGHLIGHTING — 112

Stocks tumble amid concerns over technology

Dow records biggest one-day drop since Nov. 27; economic worry weighs

NEW YORK - Wall Street tumbled Monday, as growing concerns over technology companies led jittery investors to pull money out of the market ahead of this week's earnings reports.

The market has been vulnerable to erratic trading lately, with investors cautious about the direction of the economy and companies' results. The tech sector so far has been knocked down the most, after Apple Inc.'s and Intel Corp.'s outlooks last week fell below the Street's expectations.

With industry leaders like Qualcomm Inc. and Microsoft Corp. releasing their financial results later this week, many investors are bracing for disappointment. — 90

"The market is nervous," said Joe Ranieri, managing director in equity trading at Canaccord

FIG. 9

MyBlog.com

HTTP://myblog.com

FRIDAY, MAY 19, 2007

TODAY's MARKET OVERVIEW

Stocks picked up where they left off last Friday, catching a bid on another round of M&A activity.

Per usual, the first day of the trading week was packed with more deal-making news, lending further evidence that the financial markets continue to draw strength from the liquidity factor.

The day's biggest headline involved news that a consortium led by the Royal Bank of Scotland sweetened its bid for ABN Amro (ABN 47.98 - 0.29) to $95.5 bln. That represented a 13.7% premium to the offer made by Barclays (BCS 57.98 +0.63).

BLOG ARCHIVE

▽ 2007
   ▽ MAY (1)
   ▽ APRIL (7)

WHAT OTHERS ARE SAYING:

JANE DOE'S HIGHLIGHTS:

With industry leaders like Qualcomm Inc. and Microsoft Corp. releasing their financial results later this week, many investors are bracing for disappointment.

Stocks tumble amid concerns over technology

Dow records biggest one-day drop since Nov. 27; economic worry weighs

NEW YORK - Wall Street tumbled Monday, as growing concerns over technology companies led jittery investors to pull money out of the market ahead of this week's earnings reports.

The market has been vulnerable to erratic trading lately, with investors cautious about the direction of the economy and companies' results. The tech sector so far has been knocked down the most, after Apple Inc.'s and Intel Corp.'s outlooks last week fell below the Street's expectations.

With industry leaders like Qualcomm Inc. and Microsoft Corp. releasing their financial results later this week, many investors are bracing for disappointment.

"The market is nervous," said Joe Ranieri, managing director in equity trading at Canaccord Adams. "We've had a few good quarters in a row in tech land. The problem with having good quarters is, it gets harder and harder to impress."

Blue chip stocks were also dragged down by a Wachovia analyst's downgrade of Boeing Co., the analyst cited possible aircraft order delays from the jet maker.

Overall, earnings reports and economic data this year have signaled growth that's cooling, but not

FIG.15

NEWS.com

WORLD U.S. REGION BUSINESS TECHNOLOGY SCIENCE HEALTH SPORTS OPINION STYLE TRAVEL
POLITICS WASHINGTON EDUCATION

Clinton Camp Turns to a Star in Money Race

Concerned about Senator Barack Obama's presidential fund-raising, Senator Hillary Rodham Clinton's campaign has dispatched former President Bill Clinton to attend 16 fund-raisers in the last six weeks and to lead conference calls and Internet appeals to donors, in some cases assessing Mr. Obama's positions on Iraq.

Democrats close to the couple say that Mr. Clinton's efforts on his wife's behalf were just beginning and that they were likely to accelerate after he finishes writing a book this spring. Several donors said that Mr. Clinton's role was even greater than they originally expected after Mrs. Clinton announced her candidacy on Jan. 20.

The early deployment of Mr. Clinton highlights the continuing concerns in the Clinton camp about the strength of Mr. Obama's candidacy and his fund-raising prowess. The Clinton camp has tried to stop any drift of Democratic donors to the Obama camp, since the campaign finance reporting period ending tonight is seen as a huge test of the campaigns' money-raising abilities as they gird for a crush of early primaries.

SIGN IN TO EMAIL OR SAVE THIS
PRINT
HIGHLIGHT IT — 460
SINGLE PAGE
REPRINTS
SHARE

FIG. 26

| FILE | EDIT | VIEW | BOOKMARKS | TOOLS | HELP |

MyBlog.com

HTTP://www.myblog.com

FRIDAY, MAY 5, 2007

ATTITUTES...

Author Martha Peace wrote a book some years back titled "Attitudes of a Transformed Heart." The premise of her work is Romans 12:2, i.e., be "transformed by the renewing of your mind" and not being "conformed to this world." Non-Christians and Christians alike often embrace a low view of God, and consequently a casual view of sin and Scripture. Instead of perceiving God as "Most High", they attempt to make God subservient to man by thinking of "Man (as) Most High." This low view of God is reflected in their attitudes about God, their attitudes about Scripture, and their attitudes of the heart.

[HIGHLIGHT IT] 462

BLOG ARCHIVE

▽ 2007
 ▽ MAY (1)
 ▽ APRIL (7)

FIG. 27

MyFriends.com

FILE  EDIT  VIEW  BOOKMARKS  TOOLS  HELP

HTTP://www.myfriends.com

Jane Doe

PROFILE:

AGE: 27

OCCUPATION: NURSE

COMPANY: SEQUOIA HEALTH CLINIC

| SIGN IN TO EMAIL THIS PERSON |
|---|
| PRINT |
| HIGHLIGHT IT |

464

ABOUT ME:

I have been a nurse with sequoia health clinic for 10 years now. I love helping other people in my job.

In my free time, I love to bike, play tennis, and golf. I also enjoy reading science fiction novels. I also love to travel.

I am interested in meeting new people and making new career connections.

FIG. 28

SEARCHING FOR USER SELECTED PORTIONS OF CONTENT

RELATED APPLICATIONS

The present application is a continuation-in-part of U.S. patent application Ser. No. 17/112,544 filed on Dec. 4, 2020. U.S. patent application Ser. No. 17/112,544 was a divisional of U.S. patent application Ser. No. 16/406,589 filed on May 8, 2019. U.S. patent application Ser. No. 16/406,589 was a continuation-in-part of U.S. patent application Ser. No. 15/042,977 filed on Feb. 12, 2016 (now issued as U.S. Pat. No. 10,289,294). U.S. patent application Ser. No. 15/042,977 was a continuation-in-part of U.S. patent application Ser. No. 13/831,331 filed on Mar. 14, 2013 (now issued as U.S. Pat. No. 9,292,617). U.S. patent application Ser. No. 13/831,331 was a continuation-in-part of Ser. No. 11/766,786 filed on Jun. 21, 2007 (now issued as U.S. Pat. No. 8,910,060). U.S. patent application Ser. No. 11/766,786 claimed benefit of U.S. Provisional Patent Application with Ser. No. 60/815,467 filed on Jun. 22, 2006. Further Ser. No. 11/766,786 incorporated U.S. patent application Ser. No. 11/766,669 (now issued as U.S. Pat. No. 8,661,031), the contents of all of these applications are hereby incorporated by reference in their entirety. Further, U.S. Pat. No. 7,966,623 filed on Jun. 22, 2007 is also incorporated by reference into the present application in entirety. U.S. Pat. No. 7,844,891 filed on Jun. 21, 2007 is also incorporated by reference into the present application in entirety. U.S. Pat. No. 8,156,178 filed on Mar. 5, 2007 is also incorporated by reference into the present application in entirety. U.S. Pat. No. 8,352,573 filed on Jun. 22, 2007 is also incorporated by reference into the present application in entirety. U.S. Pat. No. 8,661,031 filed on Jun. 21, 2007 is also incorporated by reference into the present application in entirety. U.S. Pat. No. 8,910,060 filed on Jun. 21, 2007 is also incorporated by reference into the present application in entirety. U.S. patent application Ser. No. 11/766,791 filed on Jun. 21, 2007 is also incorporated by reference into the present application in entirety. U.S. patent application Ser. No. 13/678,547 filed on Nov. 16, 2012 is also incorporated by reference into the present application in entirety. U.S. patent application Ser. No. 14/067,875 filed on Oct. 30, 2013 is also incorporated by reference into the present application in entirety. U.S. patent application Ser. No. 14/168,417 filed on Jan. 30, 2014 is also incorporated by reference into the present application in entirety. U.S. patent application Ser. No. 14/170,084 filed on Jan. 31, 2014 is also incorporated by reference into the present application in entirety. U.S. patent application Ser. No. 14/249,772 filed on Apr. 10, 2014 is also incorporated by reference into the present application in entirety. U.S. patent application Ser. No. 14/067,875 filed on Oct. 30, 2013 is also incorporated by reference into the present application in entirety. U.S. patent application Ser. No. 17/037,247 filed on Sep. 29, 2020 is also incorporated by reference into the present application in entirety. U.S. patent application Ser. No. 17/102,247 filed on Nov. 23, 2020 is also incorporated by reference into the present application in entirety. U.S. patent application Ser. No. 17/077,554 filed on Oct. 22, 2020 is also incorporated by reference into the present application in entirety.

FIELD

The present invention relates generally to computer network based information retrieval and sharing techniques. More particularly, the present invention relates to methods, systems, and apparatuses that enable—either a user, or some automated system—to perform a multitude of functions such as mark-up, select, match, search, and/or highlight portions of content (such as text, images, etc.) on a document for better visibility, later retrieval, display, publishing, sharing with one or more other users, and a set of multiple improvements to existing computer technologies. The present invention also relates to enabling content providers, browsers, and authors of web-based content to enable highlighter functionality on web pages; and for searching for and ranking, rating or otherwise indicating the significance of a document, or a portion thereof. Amongst other things, the invention also provides simple and effective mechanisms to manipulate a URL to automatically invoke enhanced functionality to work with a user's web browsing session.

BACKGROUND

A wealth of information is available on the Internet, and particularly that segment of the Internet referred to generally as the World Wide Web. However, despite vast improvements in search engines, finding the particular information that one is interested in can still be a challenging and time-consuming task. Perhaps even more frustrating is the lack of tools available to enable a user to retrieve previously searched for and discovered information. In the realm of search and retrieval, search engines aid in the search but leave much to be desired when it comes to information retrieval.

One common mechanism used for information retrieval is referred to generally as a bookmark. A bookmark is a mechanism or function enabling a user to save a copy of a uniform resource locator (URL). For example, if a user finds an article of interest at URL, http://www.interesting-article.com/article_12345.htm, the user can save the URL as a bookmark so that at a later time the user can simply select (e.g., with a mouse or other pointing device) the bookmark to reload the document associated with the URL. The user might choose to categorize the bookmarks. Traditionally, bookmarks have been facilitated by a web browser application and stored at the computer on which the web browser application resides. However, more recently online bookmarking services have provided users with a way to store bookmarks online, making the bookmarks accessible from any network-connected computer.

As a means of information retrieval, bookmarks have several shortcomings. One problem with bookmarks is they provide little, if any, explanation or context as to what it is about the associated document that may be significant. For instance, a bookmark simply associates a URL with a document. A user may generate a bookmark for a particular web page because of a single passage in an article, or a particular blog entry on a web page with many blog entries. When the user retrieves the web page at a later time by means of selecting the bookmark, the user may not be able to remember what it is that is significant about the web page and why he or she saved the bookmark in the beginning.

Another problem with bookmarks is that they become stale, and in some cases expire, over time. For instance, an internet document may change between the time that a user generates a bookmark, and then revisits the associated web page at a later time. In some cases, a URL, may expire altogether. For example, the document associated with the URL may be removed from the server such that the URL returns an error message indicating the document no longer exists.

Another problem with bookmarks is they are a less than ideal mechanism for sharing information. For example, to share information with a bookmark facilitated by a web browser application, a user must generally email the bookmark to another user. When the recipient receives the email including the bookmark, the user must select the link—if the bookmark is implemented as a user-selectable link—in order to initiate loading of the associated document in the user's web browser application. Often the bookmark is not a user-selectable link. In this case, the user must copy-and-paste, or type, the corresponding URL of the bookmark into the address bar of the web browser application. The copy-and-paste method sometimes does not work because of special characters, such as carriage return and line feed characters, in the URL. In any case, the additional steps required to access the relevant document are often viewed as burdensome. Often it is only a subset of individuals who end up going through the process necessary to load the relevant document. When the relevant document is finally loaded into and displayed by the recipient's web browser, the recipient of the bookmark may not appreciate the relevance of the associated document.

Realizing that many email recipients will not follow embedded links, some senders have devised a strategy wherein they copy-paste the relevant portions of an internet document into the body of an email. However, this simply shifts the copy-paste workload from the recipient to the sender. Furthermore, on the receiving end, the context is lost and credibility is in doubt as to the authenticity of the pasted material with respect to the original content. Thus, improved tools for information retrieval and collaboration are needed.

Web-based content providers, such as news websites and/or blog websites often provide users with a button enabling the user to generate and send an email including a hyperlink back to a news story or blog entry, or a copy of the news story or blog entry embedded in the email. Accordingly, if a friend would like to share a news story from a news website or a blog entry from a blog website, the user can simply press (e.g., with a mouse or pointing device) a graphical user interface button to generate an email with an embedded copy of, or a link to, the relevant web page. The recipient of the email can then view the relevant web page, either directly in the email, or by selecting a hyperlink in the email.

Sharing content in this manner has a few drawbacks. First, because many websites generate emails that only include a hyperlink back to a relevant web page, as opposed to an embedded copy of the relevant web page, recipients of such emails must go through the process of loading the relevant web page by selecting, copying and pasting, or typing the relevant URL of the hyperlink. This means that a recipient of the email must select (e.g., with a mouse or pointing device) the hyperlink in the email in order to retrieve the relevant article with his or her web browser application. Many users would rather not be bothered with this extra step. Furthermore, after the recipient has retrieved the relevant web page with a web browser, he or she may still not appreciate the relevance of the specific content. That is, the recipient may not understand or realize the significance of the web page as a whole, and therefore may not spend the time necessary to read and understand the content.

A variety of attempts have been made at organizing the vast amount of material (e.g., internet documents or web pages) available on the Internet in general, and the World Wide Web in particular. Many attempts at organizing internet documents are directed at making it easier to perform searches and for identifying the most relevant material. Although certain techniques for organizing internet documents have proven more successful than others, each method suffers from one or more flaws.

One approach to the problem involves organizing internet documents into a predetermined hierarchy to form a directory of content. Under this approach, a directory or hierarchical structure is created that includes several categories and perhaps several sub-categories based on subject matter. Next, one or more persons individually analyzes each internet document and assigns the document to one or more categories.

This general approach suffers from numerous problems. First, because this approach does not depend on automated analysis, the vast amount of material that requires analysis makes this approach expensive (in terms of man-hours) to implement. That is, employees of the enterprise providing the search service must spend significant amounts of time, at the employer's expense, analyzing and categorizing web pages. Furthermore, because the analysis is dependent upon human reasoning and the number of persons needed to perform the analysis is significant, there is a significant likelihood that inconsistencies will exist. For instance the interpretation by different persons analyzing the content is likely to differ, thereby resulting in inconsistent organization of the content. Moreover, as web authoring tools have improved, web-based content has become much more dynamic. Consequently, content must be frequently revisited and re-analyzed in order to maintain accurate categorization.

A second approach to the problem involves automating the task of organizing content by using software agents (referred to as bots) to analyze content (including metadata associated with each document.) Under this approach, a software agent referred to as a bot or web-crawler automatically performs an analysis of a large number of internet documents, and creates an index based on the analysis. The index is then used by a search engine to perform a "look-up" of those documents that include key words or phrases specified in a search query. The search results will generally be ordered or ranked based on document relevance, for example, measured as the number of times a key word is included in a document.

One problem with this approach is that content authors can easily manipulate search results by including metadata in an internet document. For instance, if enterprise A is a competitor of enterprise B, enterprise A can include as metadata the name of enterprise B in its internet documents. This will raise the level of significance of enterprise A's internet documents for searches that include as a keyword the name of enterprise B. For example, if a user performs a search for the name of enterprise B, an internet document of enterprise A is likely to be included in the search results, and possibly listed higher in order than an internet document for enterprise B. This ability to manipulate search results makes this method problematic.

In yet another approach to the problem, metadata manipulation is overcome by determining an internet document's relevance based on an analysis of incoming links directed to a particular internet document. For example, if the analysis of a large number of internet documents indicates that a particular internet document is the most frequently linked to document in the group, then there is an assumption that the internet document is the most relevant. Moreover, the weight given to each incoming link to a document might vary in accordance with the relevance of the document containing the link. That is, if a document that is deemed highly relevant includes a link to another document, that link may be given greater weight because of the high relevance of the document containing the link. This type of analysis is explained in greater detail in U.S. Pat. No. 6,285,999, entitled, "Method for Node Ranking in a Linked Database."

One of the primary problems with this approach is that an internet document's relevance is determined not by the end-users (e.g., the readers) of the internet document, but by the authors of other internet documents. Consequently, only content authors have a "vote" in determining a document's relevance. Many users (e.g., readers) of Internet content either have no desire to be publishers of content, or do not have the technical savvy to publish content. In any case, these users are not provided a voice in determining the relevance of Internet content. Consequently, a better method of determining content relevance is desirable.

SUMMARY

A method, system, and program for searching for a portion content contained in a document is disclosed. Accordingly, a search engine, or some other application, analyzes a document with a user selected content portion to determine a match. The particular algorithm for determining the match will vary depending upon the particular implementation. Based on this analysis, one or more portions of the document are automatically highlighted in situ.

Other aspects of the invention are described below in connection with the description of the figures.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 8 illustrates an example of a user interface object, referred to herein as a collaboration panel, which enables a user to share an internet document containing user-generated highlights with another user, according to an embodiment of the invention;

FIG. 9 illustrates an example of an email with user-generated highlights, according to an embodiment of the invention;

FIG. 14 illustrates an example of a web page with a user interface object referred to herein as a highlight roll, according to an embodiment of the invention.

FIG. 15 illustrates an example of an internet document, or web page, with user-generated highlights, according to an embodiment of the invention;

FIG. 26 illustrates an example of a news-related web page with a user interface object enabling highlighter functionality provided by a highlighting service, according to an embodiment of the invention;

FIG. 27 illustrates an example of a blog web page with a user interface object enabling highlighter functionality provided by a highlighting service, according to an embodiment of the invention; and FIG. 28 illustrates an example of a user profile web page including two user interface objects and for invoking a highlighting service, according to an embodiment of the invention.

DETAILED DESCRIPTION

Figure 1:
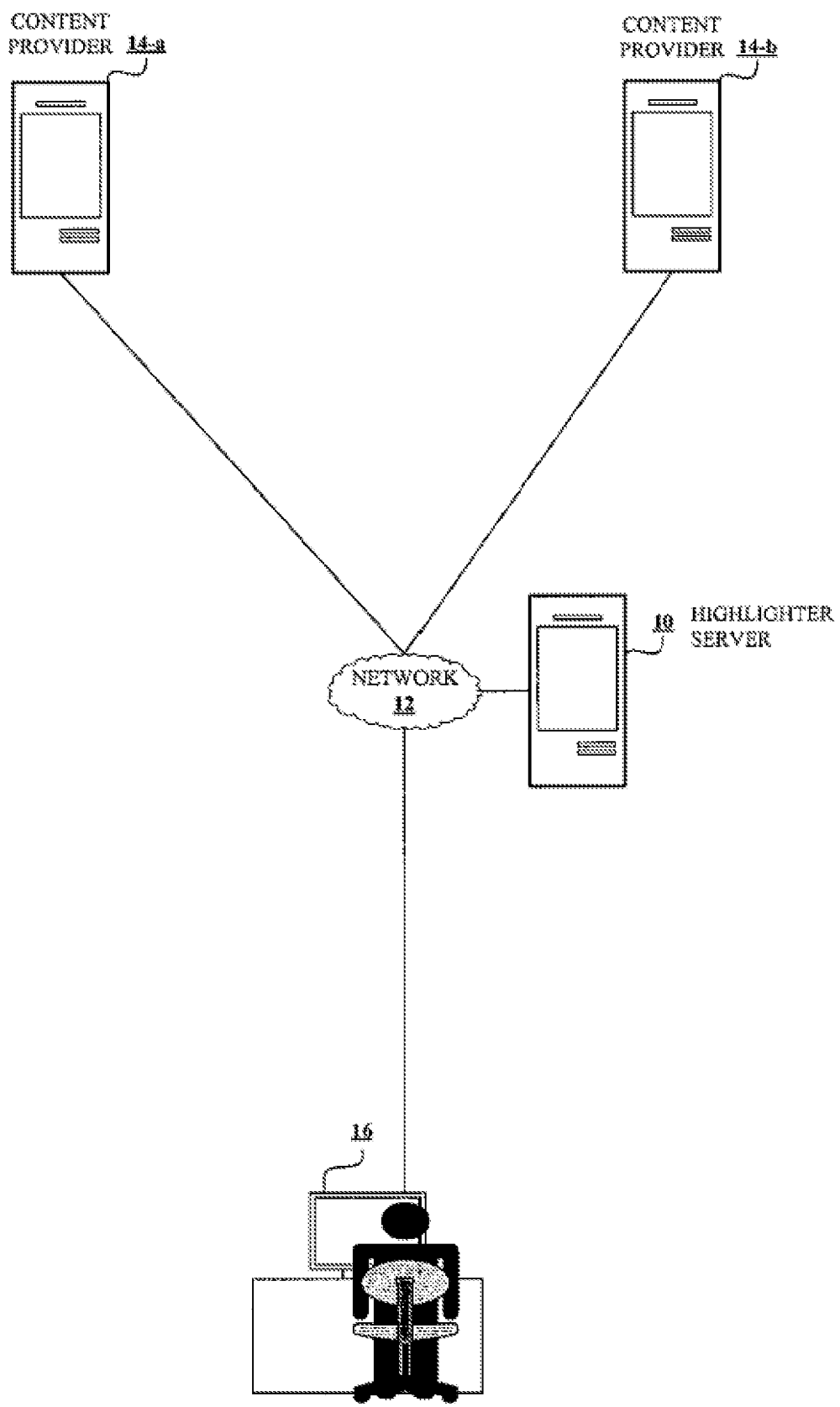
FIG. 1 illustrates an example of a computer network environment including a highlighting or highlighter server, according to an embodiment of the invention.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description. In particular, many of the various aspects and features of the invention are most easily understood by those skilled in the art when conveyed as user interface features. However, those skilled in the art will appreciate that the user interface elements illustrated and described are examples, and the invention is not to be limited by those user interface features specifically illustrated in the drawings.

Consistent with one embodiment of the invention, a highlighting service is provided by a highlighting server, which enables a user to manipulate the user interface of a web browser application executing at the user's client device to selectively highlight the text of an internet document received from a content provider's server. In so doing, any portions of text highlighted by the user are captured by the highlighter server. For example, the portion of text highlighted by the user is communicated to the highlighter server, where it is stored. Accordingly, the highlighter server enables a user to easily retrieve the highlighted text at a later time. In addition, the highlighter server enables a user to annotate and share the highlighted text, along with the internet document, with other users.

The highlighter server enables a user to selectively highlight text via a conventional web browser interface, for example, by controlling a customizable cursor with a pointing device (e.g., a mouse, trackball, joystick). The manner in which the user manipulates the user interface to selectively highlight text is similar to the way in which a user would highlight text in any number of conventional text editing applications. For example, the user may simply press and hold a button of a pointing device while manipulating a cursor with the pointing device to select a particular portion of text. However, in accordance with an embodiment of the invention and in contrast to conventional text editing applications, the highlighter server enables a user to highlight the text and graphics of internet documents served from a content provider server with the conventional controls and features of a web browsing application, without installing any special software. Moreover, any highlights made by the user are communicated in near-real-time to the highlighter server without any need for any additional user interaction. Consequently, any highlights the user makes are automatically saved at the highlighter server and can easily be viewed during a subsequent web browsing session. In an alternative embodiment of the invention, the highlights could be saved on a local device.

In addition to enabling a user to easily retrieve highlighted portions of internet documents, the highlighter server facilitates various methods of sharing highlighted portions of text with other users. For instance, in one embodiment, after a first user has made a highlight to a particular internet document, a subsequent user viewing the same document with the highlighting service invoked will optionally be able to see the first user's highlight(s). Similarly, if multiple users previously made highlights to a particular document, a subsequent user will be able to see all user's highlights. To avoid becoming overwhelmed with highlights, a user, and/or the system, can configure the settings of the highlighting service such that only highlights made by user-selected persons (including oneself), or those persons who are a member of a user-selected and/or system-selected group, are displayed. In yet another aspect, a user may generate and send an email to another user such that the email includes the highlighted portions of text and/or the entire document as highlighted.

It will be appreciated by those skilled in the art that various architectures may be used to implement a highlighting service consistent with the invention described herein. Furthermore, although many functions described herein are attributed to either a client or a server, those skilled in the art will appreciate that in alternative embodiments of the invention, a function attributed herein to a server, may in fact be implemented on, or provided by a client device. Similarly, a function described herein as being provided by a client, may be provided by a server in an alternative embodiment of the invention. Other aspects of the invention will become apparent from the descriptions of the drawings that follow.

Although the present invention is described herein primarily in the context of a highlighting service, those skilled in the art will recognize a wide variety of other applications that are consistent with the general spirit of the invention. For instance, consistent with another embodiment of the invention, a client web browser directs a request for a document (either directly, or indirectly) to a content provider hosting the document. The request may be directed to an intermediate server or intercepted by an intermediate server, which in turn, forwards the document request on to the content provider server. The content provider server sends the requested internet document to the intermediate server where it is modified in some manner "on the fly". That is, the requested internet document is modified by the intermediate server in near real time, before it is forwarded on to the requesting client web browser. Accordingly, the requesting client web browser receives a modified copy of the requested document, without making any actual modification to the document stored on the content provider server. In an alternative embodiment of the invention, the requested document is communicated from the intermediate server to the client web browser in its original unmodified form, along with a code module. At the client web browser, the code module is executed or interpreted, causing the client to modify the original document in some manner.

The modification to the document made by the intermediate server in near real time (or the client) may include overlaying an object on the document, changing a portion of the document, altering the references in a document, adding an additional element or component to the internet document, or alternatively, removing or deleting a portion or element of the originally requested document. For example, in one embodiment of the invention, a portion of the document may be highlighted. In another embodiment of the invention, an advertisement may be added or deleted from the originally requested document. In yet another embodiment of the invention, a textual portion of the document may be italicized, underlined, made bold, or have its color changed. In any case, the document is being modified by the intermediate server.

System Architecture

FIG. 1 illustrates an example of a computer network environment including a highlighter server 10, according to an embodiment of the invention. As illustrated in FIG. 1, the highlighter server 10 is communicatively coupled by means of a network 12 to several content provider servers (e.g., 14-a and 14-b). In addition, the highlighter server 10 is communicatively coupled by means of a network 12 to a user's client computer 16. It will be appreciated by those skilled in the art that the computing environment illustrated in FIG. 1 is but one example, and a wide variety of computer and network configurations might be used without departing from the spirit of the invention. For instance, the user computer, although depicted in FIG. 1 as a desktop computer, may be any of a wide variety of computing devices, including but not limited to: desktop computer, laptop computer, personal digital assistant, or mobile handset. Furthermore, although in the examples provided herein the highlighter server 10 is shown as a separate component, in one embodiment of the invention the highlighting service executing on the highlighter server 10 may reside and execute on a content provider server (e.g., 14-a, or 14-b), or a server under the control of a content provider.

In general, the user utilizes a web browser application on client computer 16 to access and display content in the form of internet documents or web pages, which are stored in whole or in part on various content providers (e.g., 14-a and 14-b). In one embodiment of the invention, a user invokes the highlighter service by prepending the address or uniform resource locator (URL) of the highlighter server 10 prior to the URL of an internet document that the user is requesting. In one embodiment of the invention, a bookmarklet, which is a button with associated code that typically resides on a web browser toolbar, automatically prepends the address of the highlighting server to the address of a document, thereby invoking the highlighting service.

Consistent with an embodiment of the invention, once a highlighter session has been invoked, a user has at his or her disposal a variety of tools for highlighting text and objects of an internet document. For instance, in one embodiment of the invention, a highlighter tool panel will appear in the web browser window and provide the user with a selection of controls enabling various features and functions of the highlighting service. In another embodiment of the invention, various controls may be provided by a highlighter toolbar. In any case, the basic function of the highlighting service is to enable a user to highlight an object (e.g., text, graphical images, etc.) of an internet document, such that the highlighted portion(s) can easily be recalled at a later time and/or shared with other users. Accordingly, as the user highlights an object, the highlighted object is communicated to the highlighter server 10 where it is stored. In one embodiment of the invention, the highlighted object (e.g., a selection of text) is stored along with any annotations or comments the user may have added, as well as a date and time indicating when the highlight was generated. The highlighted object and its associated data are stored in such a manner as to be associated with the user who generated the highlight. This allows the user to recall and view highlights from previous highlighting sessions. Furthermore, as each highlight is associated with a source (e.g., a person responsible for generating the highlight), users can configure the highlighting service to display highlights on a per user basis. That is, a user may configure the settings of the highlighting service to display only the highlights of a particular user, or group of users. For instance, as described in greater detail below, users may create and subscribe to groups. Accordingly, a user may configure the highlighting service to display highlights on a per group basis, such that only highlights from those members of a particular group are displayed. Similarly, an embodiment of the invention may enable a user to build out a social network, for example, by specifying who the user considers to be direct contacts. Accordingly, the user may configure the highlighting service to display highlights of all users within the user's social network, up to a certain degree of separation (e.g., a friend of a friend).

The highlighting service enables the user to generate highlights with conventional web browser controls. For example, in one embodiment of the invention, the user generates a highlight by simply pressing a button of a cursor control device (e.g., mouse) and dragging the cursor across an object before letting up on the button. The highlights generated by a user, according to an embodiment of the invention, are persistent over user-initiated cursor activity as well as web browsing sessions. That is, after making a highlight, each user-generated highlight remains even after the user clicks on a different portion of the internet document. Similarly, a user can navigate away from an internet document or web page on which the user has made a highlight, and the next time the user revisits the web page, the highlight will be visible so long as the user has invoked a highlighting session via the highlighting service.

In one embodiment of the invention, the highlighting service is enabled without requiring the user to download and install a client-side software application. That is, the highlighting service is enabled via the standard functions of the web browser application on the client side. For instance, in one embodiment of the invention, asynchronous JavaScript and extensible markup language (XML), referred to as Ajax, are used to provide an interactive user experience via a conventional web browser application, without the need for downloading and installing any customized software. Alternatively, the highlighting service may be enabled by a browser plug-in or browser extension. For instance, a user may download and install a software application that when executed, works in conjunction with a web browser application to enhance the functionality of the web browser application—in this case, enabling the highlighting service. In yet another embodiment, the highlighting service may be enabled by a stand alone software application. That is, the client side functionality of the highlighting service may be attributed to a daemon, or some other stand alone software application.

Figure 2:
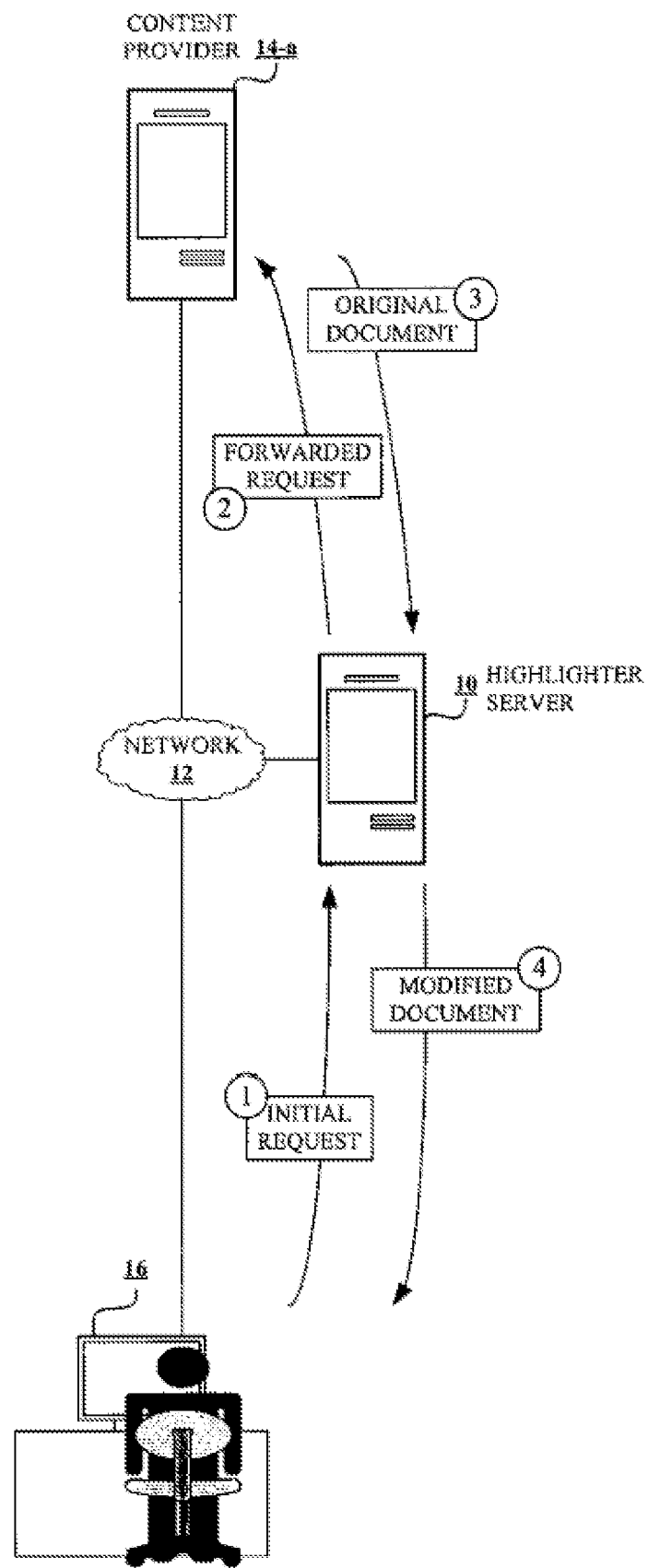
FIGS. 2 and 3 illustrate data flow diagrams showing an example of the data flow between an end-user's computing device, a highlighter server, and a content provider according to an embodiment of the invention.
Figure 3:
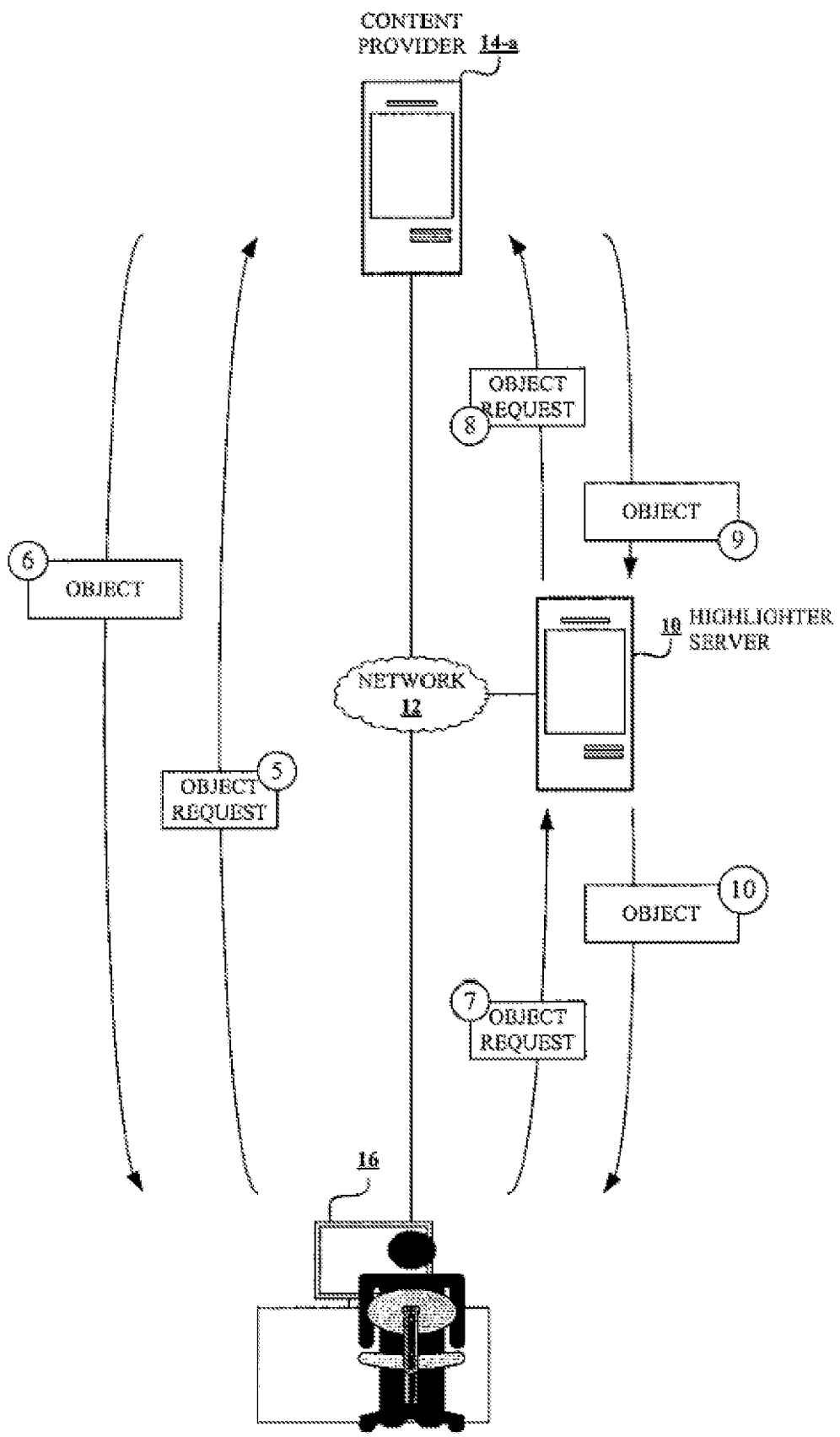

FIGS. 2 and 3 illustrate a data flow diagram showing an example of the data flow between an end-user's computing device, a highlighter server, and a content provider according to an embodiment of the invention. As illustrated in FIG. 2, a highlighting session is invoked when, at step 1, a user directs an initial request via the user's web browser application to the highlighting service hosted by the highlighter server 10. The initial request, although directed to the highlighter server 10, includes the address of a desired internet document. For instance, the address of the highlighter server 10 may be prepended to the beginning of the address of the requested document such that the request is sent to the highlighter server 10, but includes the address of the desired document hosted at the content provider 14-a. For instance, such a request may be of the form: "http://roohit.com/http://www.news.com/article123.htm".

Once the highlighter server 10 receives the initial request, the highlighter server 10 analyzes the initial request and extracts the address of the requested document. For example, the address extraction logic 22 (shown in FIG. 4) extracts the address of the requested internet document (e.g., "www.news.com/article123.htm") from the request received by the highlighter server 10 (e.g., "http://roohit.com/http://www.news.com/article123.htm"). Accordingly, at step 2, the forwarding logic 22 (shown in FIG. 4) of the highlighter server 10 forwards the document request to the content provider that is hosting the requested document. At step 3, the content provider responds by communicating the original requested document to the highlighter server 10.

Once the highlighter server 10 receives the original document from the content provider, the highlighter server 10 analyzes the original document and modifies various object references within the original document. For instance, in one embodiment of the invention, the highlighter server 10 includes reference modification logic 24 for modifying various references by prepending the highlighter server address to the existing addresses in the reference. Consequently, when an object is requested, the web browser application will direct a request to the highlighter server 10 for those objects with modified references. Finally, at step 4, the modified document is communicated from the highlighter server 10 to the client computer 16.

As illustrated in FIG. 3, when the client computer 16 receives the modified document, it attempts to request the various objects that are referenced in the document. Accordingly, at step 5, for those objects stored directly at the content provider, the client computer 16 sends object requests to the content provider 14-*a*. Requests sent directly to the content provider 14-*a* are serviced by the content provider 14-*a*, and at step 6 one or more objects are returned to the client computer 16. For those objects which have had their reference previously modified (e.g., by prepending the address of the highlighter server), the client computer directs one or more object requests to the highlighting service (e.g., at step 7). In turn, at step 8, the highlighting server 10 communicates a request for the object to the content provider 14-*a*. The content provider communicates the object to the highlighting server at step 9, and finally, at step 10 the object is communicated to the client computer 16 which displays the internet document in a web browser window.

Referring again to FIG. 2, if a user requests a document that has previously been highlighted (e.g., by the requesting user, or another user), the highlighter server 10 will modify the original document by inserting the necessary object reference to ensure that the highlight(s) are displayed when the document is rendered by the user's web browser application. For instance, the reference modification logic 24 of the highlighter server 10 will modify the object reference in the original document, such that the modified object reference will cause the particular object (e.g., selection of text) to be highlighted when displayed by the web browser application. In another embodiment of the invention, a portion of executable or interpretable code sent from the highlighter server 10 to the client enables the client to query the highlighter server 10. Accordingly, the query is processed by the highlighting service, and if a particular document has been previously highlighted, the necessary data is sent to the client's web browser application to show the highlights. In one embodiment of the invention, the query indicates the URL of the currently displayed document. The highlighting service determines whether the URL is associated with any previously generated user highlights. If so, the highlighting service determines if the current user (e.g., the user viewing the document) has configured the highlight filtering mechanisms to display any of the previously generated user highlights. If the user has optionally selected to view highlights from one or more users who have previously generated a highlight on the currently displayed page, then the highlighting service will communicate the appropriate information to the client so that the highlight will be displayed.

Figure 4:
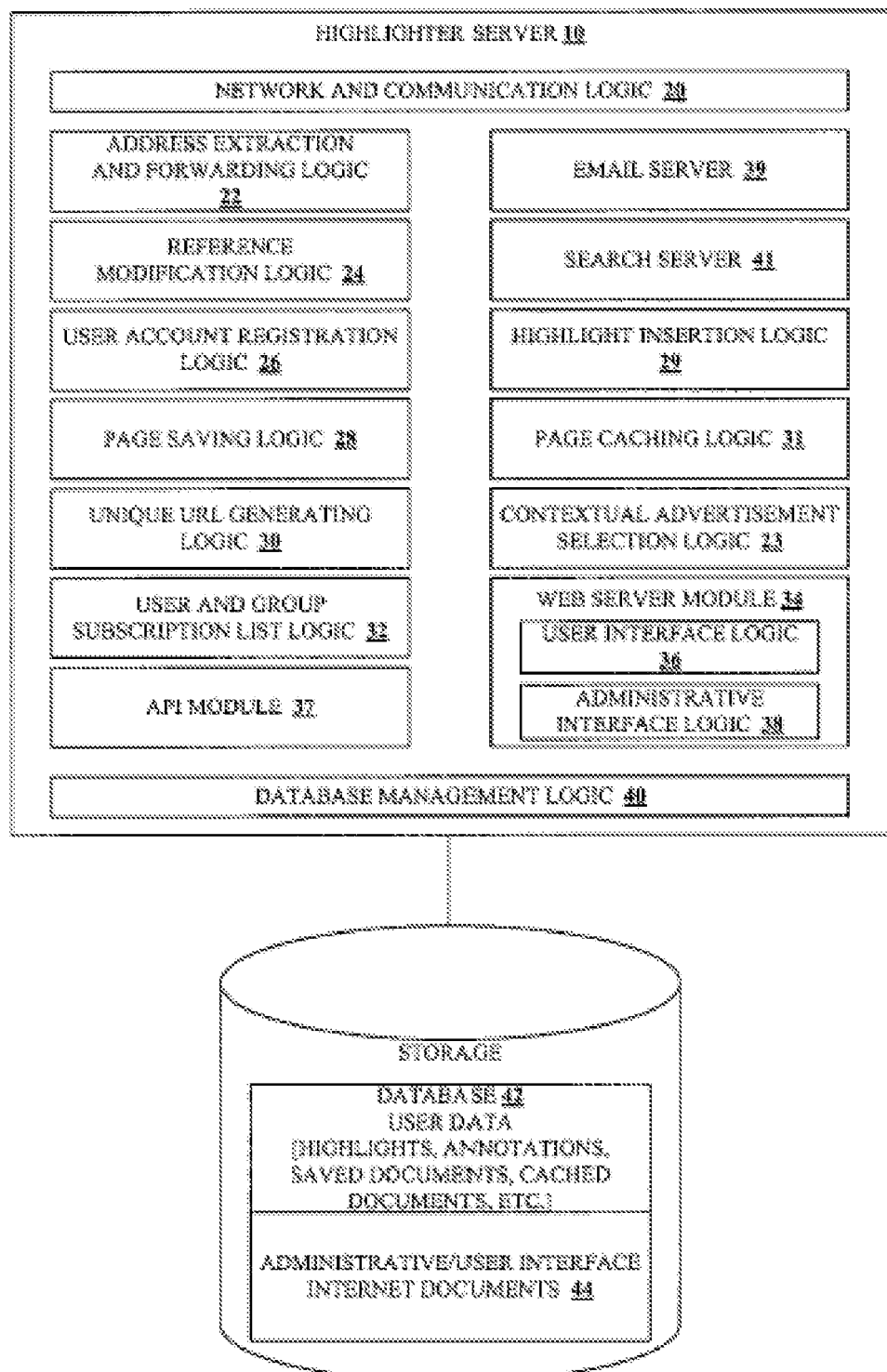
FIG. 4 illustrates a logical block diagram showing an example of the logical components of a highlighter server according to an embodiment of the invention.

FIG. 4 illustrates a logical block diagram showing an example of the logical components of a highlighter server 10 according to an embodiment of the invention. As illustrated in FIG. 4, the highlighter server 10 includes network and communications logic 20 for communicating data with various other computing devices, including client computers and content provider servers. In one embodiment of the invention, the network and communication logic 20 implements the necessary network and communication protocols, such as transfer control protocol and the internet protocol (TCP/IP) for sending and receiving data over a network, such as the public Internet. A variety of other well known communication and networking protocols may be used in accordance with an embodiment of the invention.

In one embodiment of the invention, the highlighter server 10 includes address extraction and forwarding logic 22 as well as reference modification logic 24. As described above, when the highlighter server 10 receives a request for a document hosted by another content provider, the address extraction and forwarding logic 22 extracts the document address of the requested document from the initial request received at the highlighter server 10, and then forwards the extracted document address to the proper content provider 14. Similarly, the reference modification logic 24 modifies object references in original documents received from content provider servers prior to sending the object references in the modified document to the client computer. Object references are modified, for example, to ensure that certain object requests are directed to the highlighter server, and other requests are directed directly to the content provider.

In one embodiment of the invention, the highlighter server 10 includes page caching logic 31. Accordingly, when a client requests a document hosted at a content provider, the highlighter server 10 may check its cache to determine if the highlighter server 10 has a current copy of the document stored locally. If so, the highlighter server 10 does not need to forward the request to the content provider, but instead, the highlighter server 10 can retrieve and serve the document from its cache.

In one embodiment of the invention, the highlighter server 10 includes user account registration logic 26. As described in greater detail below, in one embodiment of the invention, a user can access and use the highlighting service in one of two modes—as a registered user, or as an unregistered user. As an unregistered user, the user is not prompted to enter or provide any personal information or set-up a username and/or password. The highlighting service allows unregistered users to save and share highlights. However, if an unregistered user would like to become a registered user, the user account registration logic 26 facilitates the generation of a user account while preserving all previously generated highlights. That is, the highlight service will merge an unregistered user's data into a registered account, thereby preserving any configuration settings and highlights the user made as an unregistered user.

In one embodiment of the invention, the highlighter server 10 includes page saving logic 28 and unique URL generating logic 30. In certain situations, a user may desire to save a copy of an internet document. For instance, many internet documents—such as web pages on news sites, and blogs—are dynamic and constantly changing. Accordingly, a user may want to highlight a portion of an internet document and then save a copy of the entire page, for example, to share with another user or group of users. The page saving logic 28 enables a user to save a copy of an entire page. The unique URL generating logic 30 generates a unique URL to associate with the saved page. Therefore, to share an internet document that has been saved by the highlighting service, a user can share the unique URL generated by the unique URL generating logic 30 and associated with the saved page.

When a highlight is made on a page that tends to be dynamic (e.g., changes frequently)—for example, such as a blog site, or a news site—highlight insertion logic 29 analyzes the content of the page to determine if, and where, a previously made highlight is to be inserted. For example, as new blog entries are posted to a blog site, thereby forcing old entries to appear positioned lower on the web page, the highlight insertion logic 29 intelligently analyzes the web page to determine where to position a previously made highlight.

In one embodiment of the invention, users can display and view highlights on a per user and/or a per group basis. Accordingly, the highlighting server 10 includes user and group subscription logic 32 to manage the creation of, and subscription to, user—as well as system-defined groups. For instance, a web-based interface to the highlighting service may provide a user with an option to create a group, and invite others to join the group. Similarly, a user may search for and join previously created groups. The group subscription logic 32 facilitates and manages such tasks. Once a member has subscribed to a particular group, the member can configure the highlighting service to display highlights from all members of the group. In one embodiment, a user may subscribe to receive emails embedded with new highlights from users in a particular group. Accordingly, the user may subscribe to receive emails on a real-time basis showing all new highlights as they are made by users. Alternatively, a user may subscribe to receive a daily, weekly, or some other time period, email summary showing relevant highlights for that time period.

In one embodiment of the invention, the highlighting server 10 includes a web server module 34. The web server module 34 not only serves documents that have been forwarded from other content providers, but the web server module 20 also provides an administrative interface to administrators of the highlighter server 10, and a user interface to various features provided by the highlighter server 10. For example, in one embodiment of the invention the web server component 34, in conjunction with the administrative interface logic 38 facilitates web-based administration and configuration of the highlighter server 10. Similarly, the web server component 34, in conjunction with the user interface logic 36, facilitates web-based configuration and setup of various features of the highlighting services provided by the highlighter server 10. A storage device stores internet documents 44 associated with the user interface logic 36 and administrative interface logic 38 provided by the web server module 34

In one embodiment of the invention, the highlighter server 10 includes database management logic 40 for managing a data repository. Accordingly, as the highlighter server 10 receives portions of text and images from internet documents as such portions are highlighted by users, the database management logic 40 stores the highlights in a database 42. Similarly, the database management logic 40 recalls the highlights from the database 42, and provides the associated data to the web server module 34 so that the document can be manipulated (either at the server or at the client) in a manner that will display highlights when the document is rendered by a client's web browser.

In one embodiment of the invention, the highlighter server 10 includes contextual advertisement selection logic 23 for analyzing the user-generated highlights on an internet document, for the purpose of selecting advertisements to be embedded or inserted in an internet document. For example, when a user requests an internet document during a highlighting session, one or more advertisements may be inserted or embedded in the internet document by the highlighter server 10, based on an analysis of the requested document, and/or highlighting information derived from the highlighting service. For example, the highlighting information may include highlights included on or associated with the requested internet document. The highlighting information on which the selection of an advertisement is based may also include comments associated with highlights on the requested document. In addition, a user's highlighting or commenting history may be analyzed. For example, the contextual advertisement selection logic 23 may analyze a user's previous highlights. Similarly, the highlighting activity of a user's friends or contacts may be used to select advertisements to be embedded in an internet document. A keyword matching algorithm may be used to identify advertisements associated with certain keywords, where the advertisements are inserted into internet documents that match those keywords within a user-generated highlight.

In one embodiment of the invention, the highlighter server 10 includes an email server 39. Accordingly, the email server 39 facilitates the generation and sending of emails by users. For example, via one or more user interface objects, a user may be prompted to enter or select an email address in order to send a copy of a currently displayed internet document—including any user-generated highlights—to another user. The email server not only facilitates the sending of the email, but also the generation of the email and the formatting of any highlighted objects. Accordingly, an email recipient will receive an email with an embedded internet document showing any user generated highlights made by the user. The recipient need not download any special software in order to view the sent internet document and associated highlights. In addition, the highlight server 10 may insert or embed within the email and/or the internet document one or more advertisements, where the advertisements are selected based on an analysis of user-generated highlights. For instance, a keyword matching algorithm may be used to determine what advertisements are inserted within the internet document, based on a textual analysis of any highlights within the document.

Another component of the highlighter server 10 is a search server 41. In one embodiment of the invention, the highlighter server 10 provides a search interface where users can search for relevant internet documents and highlights. For example, a user may perform a keyword search, where the keyword is searched for in a portion of an internet document that has been previously highlighted by a user, or within an annotation or comments section associated with a particular highlight. The search server 41 may facilitate searches by user or by group, such that a user can enter the name or email address of a particular user as a search parameter. Furthermore, a user may search for content based on tags—a user-assigned, relevant keyword or term associated with or assigned to a piece of information, like a picture, article, or video clip, thus describing the item. Other aspects of the various search features are described in other sections of this document.

One embodiment of the highlighter server 10 includes an application programming interface (API) module 37. In various configurations of the highlighting server, the API module provides a common interface for communicating messages with third-party add-ons, as well as software agents. For example, in one embodiment of the invention, a third-party search engine may communicate API messages to the highlighter server, requesting information about various documents. Accordingly, the search engine may utilize an API to communicate those messages with the highlighter server 10. Similarly, third-party tools and applications that utilize highlights, and the wide variety of information and data associated with highlights, may make requests of the highlighting server 10 via the API module 37.

Those skilled in the art will appreciate that various alternative components and logic may be included in a particular implementation of the highlighter server 10, without departing from the spirit of the invention.

User Registration

Figure 5:
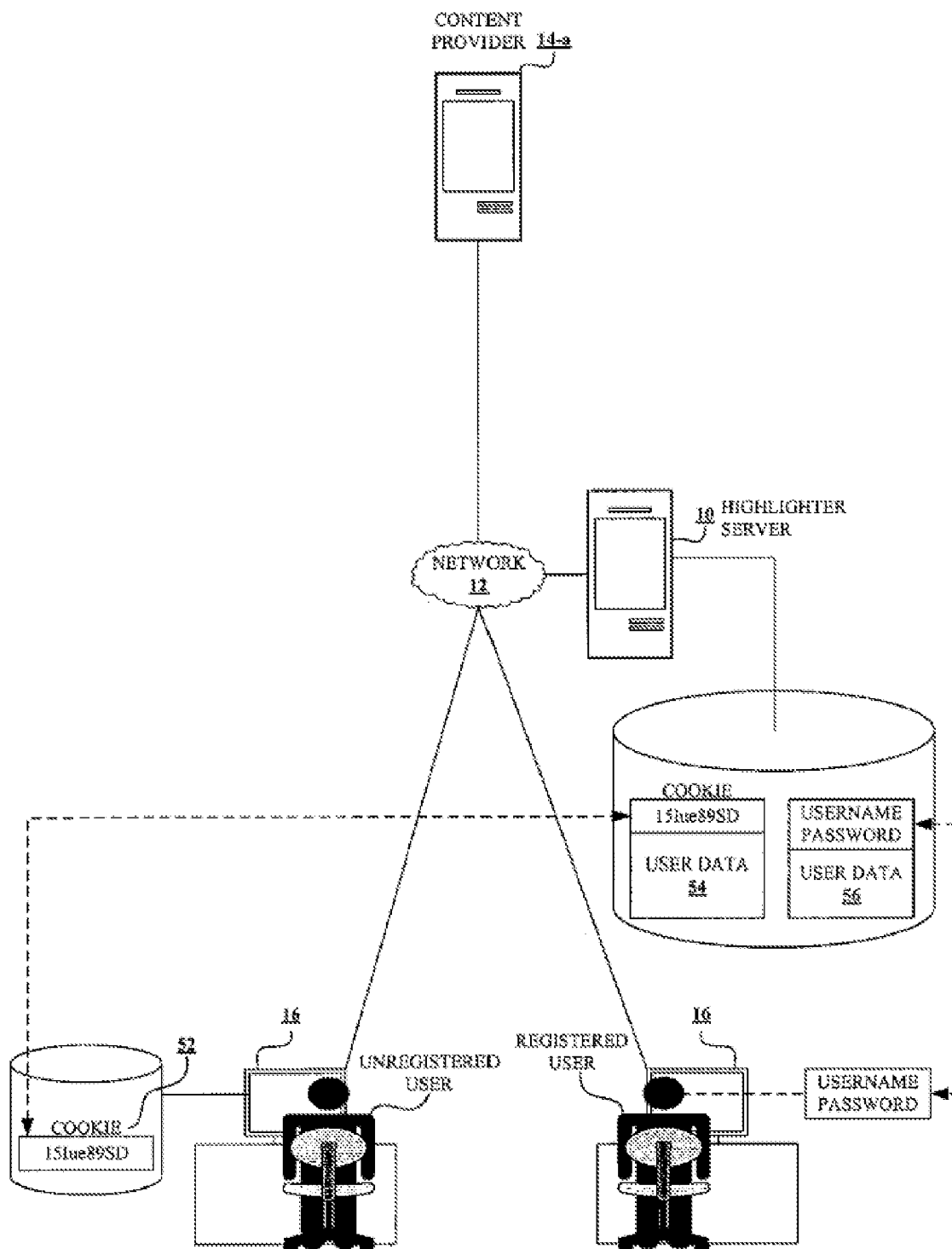
FIG. 5 illustrates an example of a registration procedure by which an unregistered user converts to a registered user, according to an embodiment of the invention.

FIG. 5 illustrates an example of a registration procedure by which an unregistered user 50 converts to a registered user 52, according to an embodiment of the invention. Advantageously, users need not download and install any customized software on a client computer in order to establish a highlighting session via the highlighter server 10. For instance, in one embodiment of the invention, asynchronous JavaScript and extensible markup language (XML), referred to as Ajax, are used to provide an interactive user experience via a conventional web browser application, without the need for downloading and permanently installing any customized software. Moreover, in one embodiment of the invention, a user need not register with the service, or establish a user account, in order to use the highlighting service. When a user has not registered with the service, a unique identifier 52 is sent from the highlighter server 10 to the client 16 executing the web browser application. The unique identifier, for example, may be an HTTP cookie that uniquely identifies the user. Accordingly, when a user selects a portion of an internet document with a highlighter cursor during a highlighting session, that portion of the document highlighted by the user is communicated to the highlighter server, associated with the unique identifier, and then stored at the highlighter server 10 (e.g., as user data 54 in FIG. 5). If, during a subsequent browsing session, a request is made for the same document, and the request includes the user's unique identifier, the highlighter server 10 will associate the highlighted portion of text with the unique identifier and manipulate the requested document to cause the highlight(s) to appear when the document is displayed in the user's web browser window. If a user decides to register with the highlighting service, the unique identifier (e.g. the HTTP cookie) is associated with a new human readable identifier, such as a user-selected username and password, and all previously generated highlights will be preserved and transferred to the user's registered account, as illustrated by user data 56 in FIG. 5

User Interface (Highlighter Panel/Toolbar/Collaboration Panel)

Figure 6:
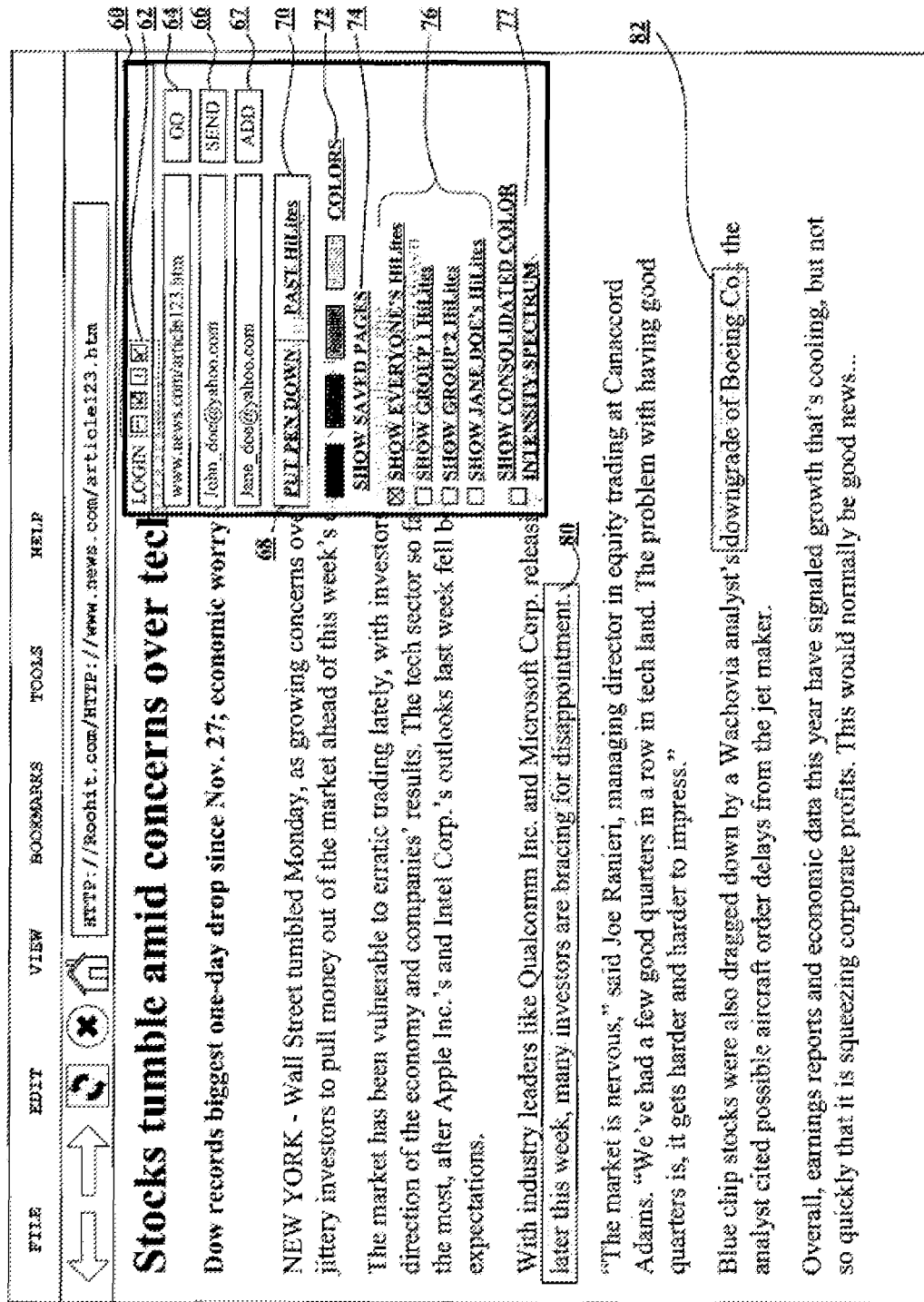
FIG. 6 illustrates an example of a user interface object, referred to herein as a highlighter panel, which enables a user to, among other things, highlight text and objects on an internet document, according to an embodiment of the invention.

FIG. 6 illustrates an example of a user interface object, referred to herein as a highlighter tool panel 60, which enables a user to, among other things, highlight text and objects on an internet document, according to an embodiment of the invention. According to one embodiment of the invention, the highlighter tool panel 60 appears as a separate window within the browser display window, and may have a variety of display modes. For instance, as illustrated in FIG. 6, the highlighter tool panel 60 is in maximized display mode and all controls are visible. In addition to a maximized mode, the highlighter tool panel 60 may also have a minimized mode. In the minimized mode, a subset of the controls may be accessible. As with conventional graphical user interface windows, a set of buttons 62 at the top of the window provide a mechanism for switching between maximized and minimized modes, and closing the tool panel window. In one embodiment of the invention, the highlighter panel may even have an invisible mode.

In one embodiment of the invention, the tool panel 60 includes an address bar 64 which provides a separate mechanism for navigating the World Wide Web and displaying internet documents hosted by different content providers. For instance, by typing an address in the text entry box of the address bar 64 displayed in the highlighter tool panel 60 and selecting the "GO" button, a user can download and display an internet document associated with the address entered. Note that the address entered in the text entry box need not include a reference to the highlighting service. The entered address will automatically be manipulated to invoke the highlighting service. If, for instance, an additional address needs to be prepended to the address entered by the user in order to invoke the highlighting service with the requested internet document, the tool panel 60 will automatically manipulate the address accordingly.

In addition to an address bar 64, in one embodiment of the invention the highlighter tool panel 60 includes an email address bar 66 where a user can enter an email address and share the currently displayed document, including any user-generated highlights in the document, with another user. For example, the email address bar 66 enables a user to enter one or more email addresses, and then select the "SEND" button to instantly send an email of the currently displayed internet document. If the currently displayed document includes user-generated highlights (e.g., highlighted text 80 and 82) those highlights will be displayed with the document in the email. Advantageously, the internet document (including any highlights) is embedded within an email such that the user need not install any special software in order to view the document and any included highlights.

In one embodiment of the invention, the highlighter tool panel 60 includes a text entry box for adding a user to a list of users whose highlights can be selectively toggled on or off. For instance, by inputting an email address (e.g., Jane_doe@yahoo.com) or username of another user in a text box, and pressing the add button 67, the user can be added to a list of users and groups 76 whose highlights can be selectively shown or hidden. Adding a user in this manner may also add the user to one or more drop down menus, selection boxes, or scroll windows (e.g., scroll window 98 in FIG. 8) used for quickly addressing emails.

A variety of other controls may be included with the highlighter tool panel 60 according to an embodiment of the invention. For example, in one embodiment of the invention, the tool panel 60 includes a button (e.g., the "PUT PEN DOWN" button 68) that toggles the cursor between a standard cursor, and a highlighter pen cursor. When the active cursor is in highlighter pen mode, for example, the highlighting tool is active. This enables a user to select text or an object using a click and drag method, by which a user simply selects an object to highlight by dragging across an object while depressing a cursor control (e.g., mouse) button. When the active cursor is not in highlighting mode, a user may select an object (e.g., a portion of text or an image) and then press a button (not shown) to generate a highlight of the selected text. In one embodiment of the invention, the tool panel 60 includes a button or link (e.g., the "PAST HiLites" button 70 in FIG. 6) that causes the web browser application to display a web page containing a list of past highlights made by the user. The list of past highlights may include a summary or excerpt from the previous highlights as well as a link to the full document from which the highlights are from. In addition, the past highlights web page may show additional information about each highlight, including but not limited to: the time and date the highlight was generated, the number of people that have viewed or selected the highlight, the address of persons with whom the user has shared the highlight, the number of other users who have highlighted the object, and/or annotations made by the user.

In one embodiment of the invention, a color palette 72 is included with the tool panel 60. By selecting a color from the color palette, the user can manipulate the color of the active highlighter cursor, and ultimately the color of any highlights the user makes. This provides each user with the ability to create customized highlight color coding schemes. Accordingly, a user may mark-up different sections of an internet document with different colors, such that each different color indicates additional information about the highlighted text. For instance, green highlighted text may support a particular proposition or indicate a positive treatment of a particular subject, while red highlighted text may indicate a negative treatment of the same subject. Those skilled in the art will appreciate the wide variety of user-customized color coding schemes that might be implemented according to an embodiment of the invention.

In one embodiment of the invention, the highlighter tool panel 60 includes a user/group filtering mechanism 74 which enables a user to select whose highlights should be displayed in a particular internet document on a per user or per group basis. For instance, referring again to FIG. 6, by selecting the "SHOW GROUP 1 HiLites" box in the tool panel 60, all highlights made by members of "GROUP 1" will be displayed to the user in the currently displayed internet document. Similarly, by selecting the "SHOW JANE DOE's HiLites" box, the user can control the display of highlights such that Jane Doe's highlights are also shown in the presently displayed document. Furthermore, in one embodiment of the invention, the filtering mechanism can be configured on a per document and/or per domain basis, such that a user can specify whose highlights the user would like to see when viewing particular documents, or documents from particular domains.

In one embodiment of the invention, the highlighter tool panel 60 includes a configuration setting that enables the user to display highlights that represent the consolidation of all user-generated highlights on a page. For example, when the check box illustrated in FIG. 6 next to the option "SHOW CONSOLIDATED COLOR INTENSITY SPECTRUM" with reference 77 is checked, the highlighting service will analyze all of the user-generated highlights associated with a particular internet document or web page. Rather than show individual highlights, the highlighting service causes portions of the internet document to be highlighted in particular colors that represent the frequency with which that portion of the document has been highlighted. For example, when the check box 77 is selected, a portion of the document that has been highlighted by many users may be shown in red. Accordingly, under this scenario, a red highlight on a particular object indicates that the particular object has been highlighted by many users. A less frequently highlighted portion of the document may be highlighted in another color. In another embodiment, the particular shade of the color may indicated the frequency with which the portion of the document has been highlighted. In one embodiment of the invention, enabling the color intensity spectrum view of highlights automatically disables the user/group view of highlights. That is, when viewing highlights in the color intensity spectrum mode, user level highlights and/or group level highlights may not be shown.

Many of the configuration settings illustrated in FIG. 6 may also be accessed and adjusted via a highlighter web portal. For example, the highlighting service provides a web-based user interface where users can set certain configuration parameters to default settings. Accordingly, when a user invokes the highlighting service without the highlighter tool panel, any configuration settings previously established via the highlighter web portal will be active by default.

Figure 7:
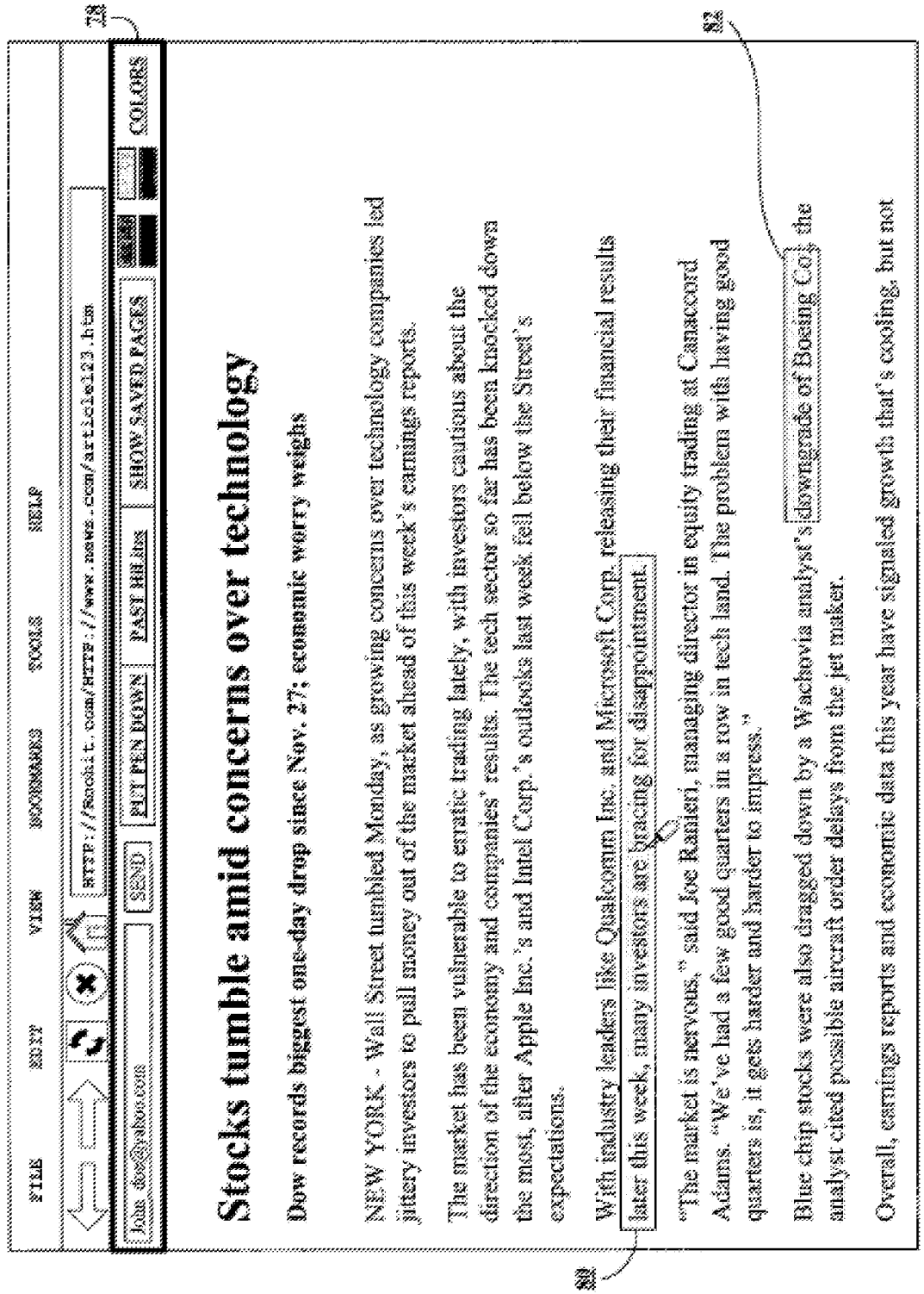
FIG. 7 illustrates an example of a user interface object, referred to herein as a highlighter toolbar, which enables a user to, among other things, highlight text and objects on an internet document, according to an embodiment of the invention.

FIG. 7 illustrates an example of a user interface object, referred to herein as a highlighter toolbar 78, which enables a user to, among other things, highlight text and objects on an internet document, according to an embodiment of the invention. Similar to the highlighter tool panel 60 illustrated in FIG. 6, the highlighter toolbar 78 is a user interface object that provides a variety of controls and features associated with the highlighting service. In one embodiment of the invention, the highlighter toolbar includes the control objects described above in connection with the highlighter tool panel 60, including but not limited to: an address bar for navigating, an email address bar for sharing the currently displayed document with any user-generated highlights, a button to toggle the active highlighter cursor on and off, a button to access previously generated highlights, a button to access previously saved pages, a color palette to change the color of highlights, and a mechanism for selecting and filtering the highlights that are displayed on an internet document on a per user or per group basis. In addition, in one embodiment of the invention, the toolbar may include third-party tools. For example, the toolbar may provide one or more control objects enabling the user to quickly and easily gain access to a third-party tool, service, or application.

Figure 8:
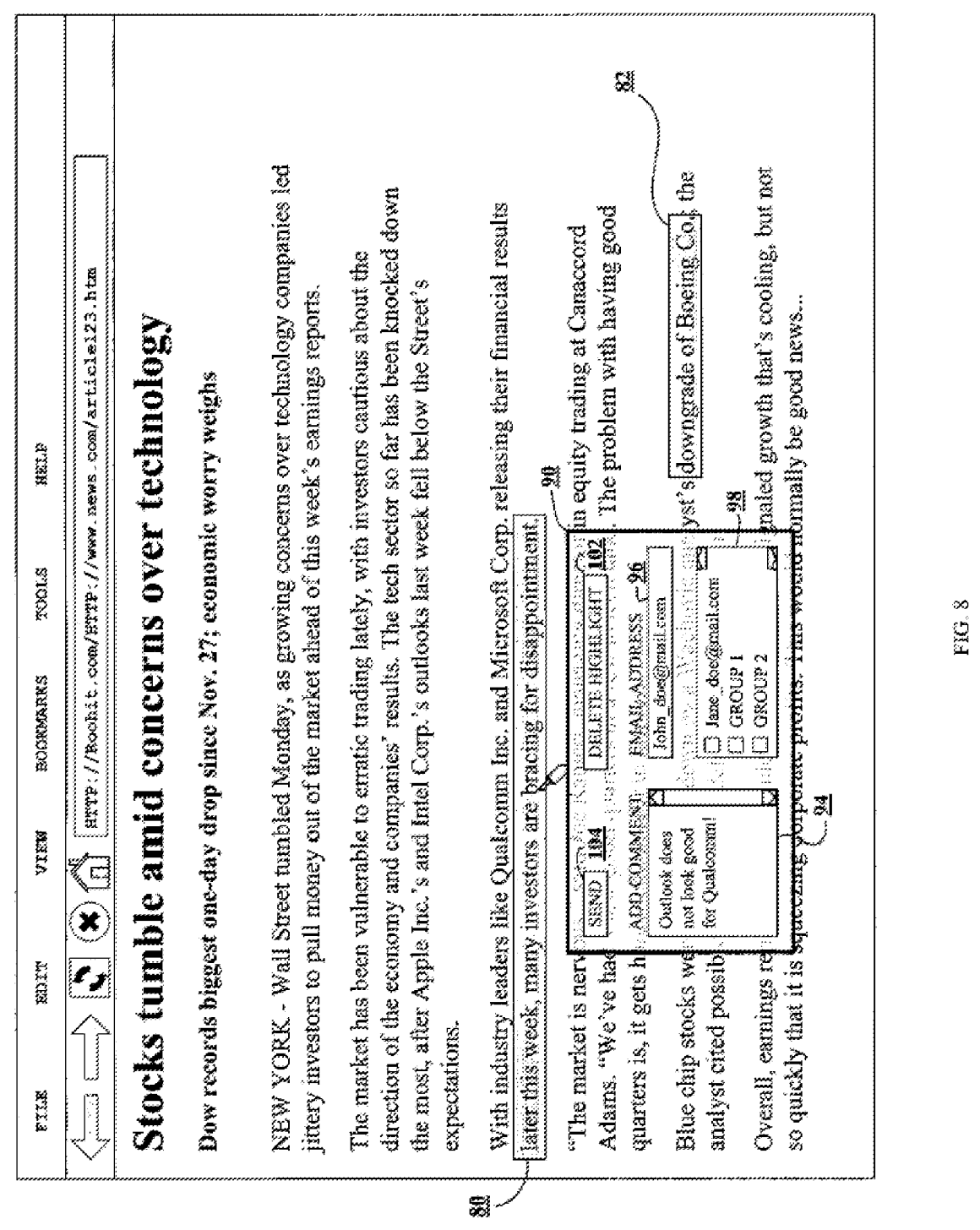

FIG. 8 illustrates an example of a user interface object, referred to herein as a collaboration panel 90, which enables a user to share an internet document containing user-generated highlights with another user, according to an embodiment of the invention. As illustrated in FIG. 8, in one embodiment of the invention the collaboration panel 90 is a mouseover window or box that appears when a user moves the highlighter cursor 92 over a particular highlight 80 in the currently displayed internet document. The collaboration panel 90 includes a text entry box 94 where a user can provide a comment about the particular highlighted object. In addition, the collaboration panel 90 includes an email address bar 96 where the user can enter one or more email addresses. Also, the collaboration panel includes a scroll window 98 with a list of other users and groups with whom the user may be associated. By checking a box, or otherwise selecting another user or group, the user can quickly address an email to the user or group. After selecting and/or entering the names of those persons/groups to receive an email, the user simply selects the "SEND" button 100 to send a copy of the currently displayed internet document, including any highlighted objects (e.g., highlights 80 and 82), embedded within an email. In one embodiment of the invention, the email server 39 of the highlighter server 10 will generate and send the email to the selected recipients. Accordingly, the recipient of such an email will be able to view the entire internet document including any highlights without downloading any additional software and/or requesting any additional internet documents. In an alternative embodiment of the invention, a link to a highlighted document may be provided in the email.

In one embodiment of the invention, the collaboration panel also provides a view of any comments that a user may have entered about a particular highlight. For instance, if a user sends a comment to another user, the other user may view the comment by simply putting the highlighter cursor over the highlight. If more than one comment is associated with a particular highlight, the comments will be displayed in order such that a user can follow along with a virtual conversation based on an exchange of comments. Just as a user may filter the highlights that are displayed, in one embodiment of the invention, comments may optionally be filtered so that a user only sees comments from particular users, or groups, of interest.

FIG. 9 illustrates an example of an email with user-generated highlights, according to an embodiment of the invention. As illustrated in FIG. 9, an email generated and sent via the collaboration panel includes a header portion 106 where the comment 108 that was entered in the text box 94 of the collaboration panel 90 is displayed. This provides the recipient of the email with additional information and context as to what is relevant about the document as a whole, and the highlight 80 in particular.

In one embodiment of the invention, the header portion 106 of the email also includes an address bar 110, where a user can enter the address or URL of a web site or document, and begin a highlighting session. For instance, by entering a URL in the address bar 110 of the email, and then pressing the "START HiLiting" button 112, a web browser window will open and the requested document will be displayed along with a highlighter tool panel 90.

Highlighter Web Portal

Figure 10:
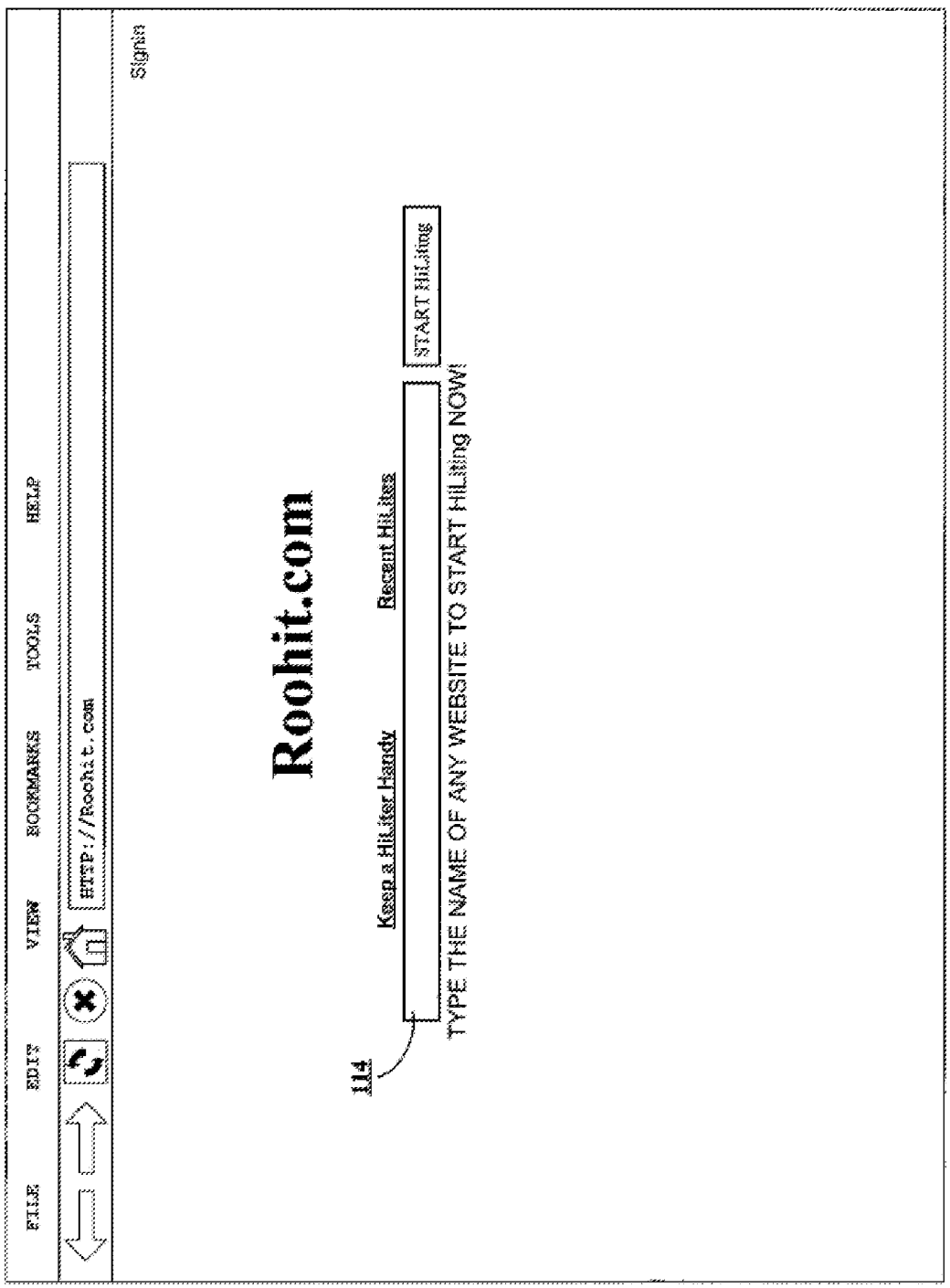
FIGS. 10 through 12 illustrate various user interface features of a highlighter web portal, according to an embodiment of the invention.

FIG. 10 illustrates a top level page (e.g. a home page) for a highlighter web portal, according to an embodiment of the invention. As illustrated in FIG. 10, in one embodiment of the invention, the home page of a highlighter web portal includes a text entry box 114 where a user can enter a URL or document address to begin a highlighting session. For example, by simply typing in the address of an internet document in the text entry box 114 and then pressing the "START HiLiting" button, a user invokes a highlighting session with the document corresponding with the address entered.

Figure 11:
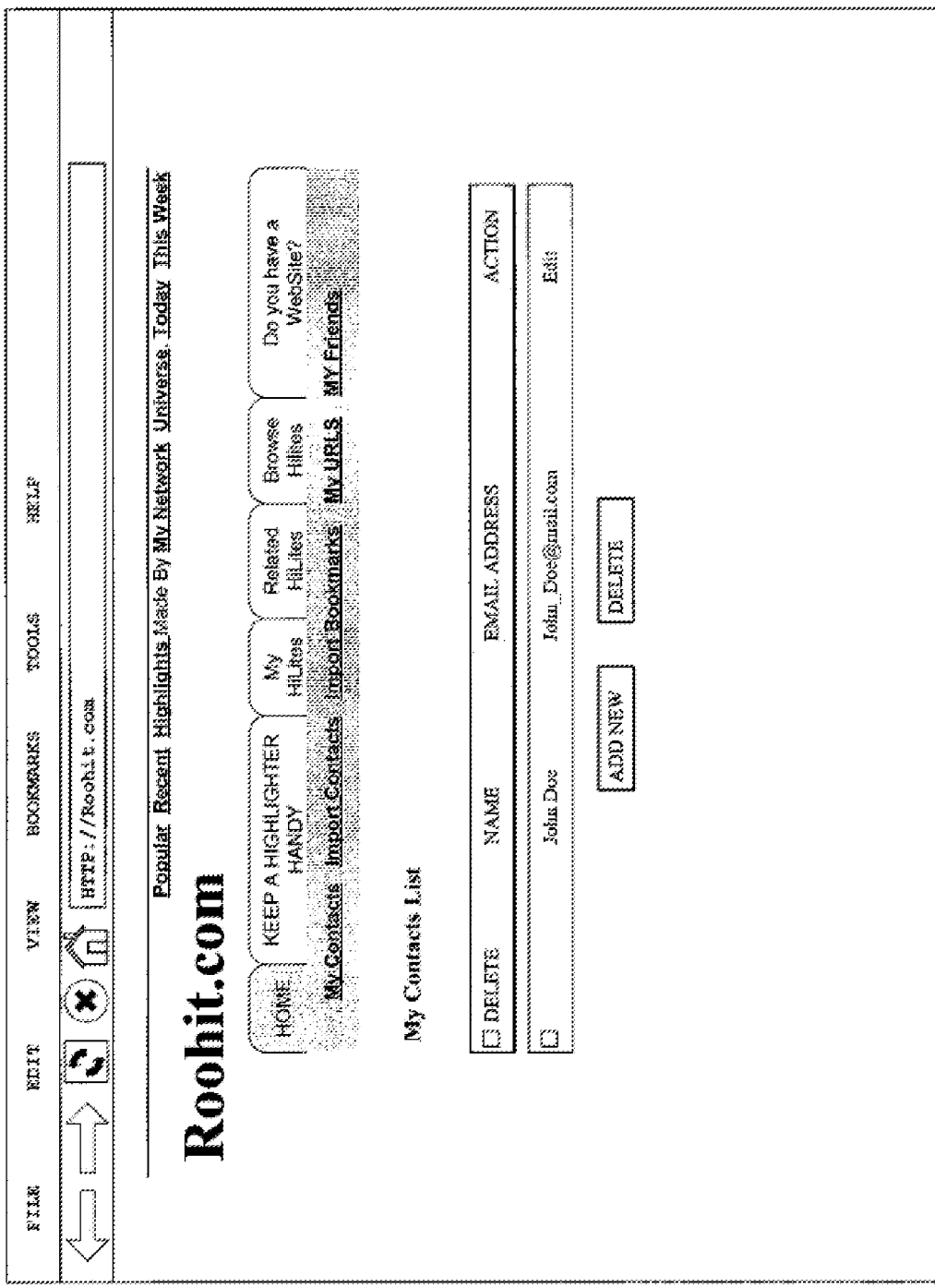

FIG. 11 illustrates a contact management page of a highlighter service, according to an embodiment of the invention. As illustrated in FIG. 11, in one embodiment of the invention, the highlighting service includes a contacts list where a user can enter and maintain personal and/or business contact information. In one embodiment, as a user shares highlights via email, the email addresses of the recipients will automatically be saved into the user's contact list. In addition, as users are added as contacts, the email addresses of those users will automatically populate certain user interface objects, such as the scroll window 98 in FIG. 8.

In one embodiment of the invention, the contact management interface may also provide a mechanism for users to build out or define a social network. For example, a user may specify which contacts to include in his or her social network. Accordingly, several of the features described herein may be configured on the basis of one's social network. For example, a user may select to see all highlights from any member within his social network.

Figure 12:
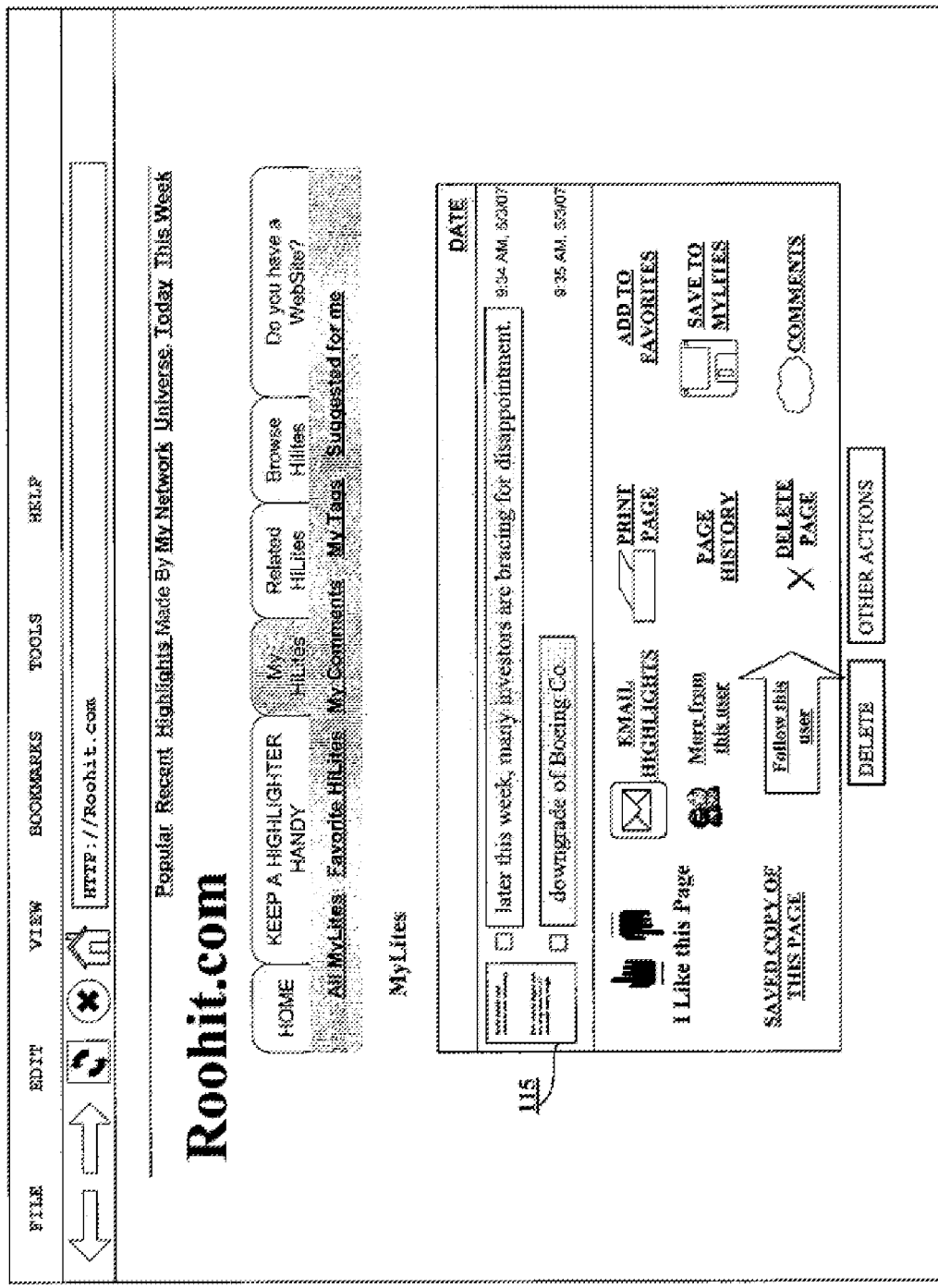

FIG. 12 illustrates a HiLites summary page, according to an embodiment of the invention. In one embodiment of the invention, a highlighter web portal provides the user with easy access to a list of all previously generated highlights of a particular user (including oneself). In addition to showing a thumbnail 115 of the document which the highlights are from, the list also includes a variety of icons enabling the user to take several actions in connection with a selected highlight, or a comment associated with a highlight. For instance, a user may rank or rate a highlight, a comment, and/or an internet document containing a highlight or comment. In one embodiment, a user may select a link to see more highlights or comments from a particular user. In addition, the user may select a button or link enabling the user to subscribe to a particular user's highlighting activities. Accordingly, as the particular user makes new highlights, a copy of such highlights and/or the internet document containing the highlights may be sent to the user in real-time, or on a predetermined or user-configured periodic schedule.

Figure 13:
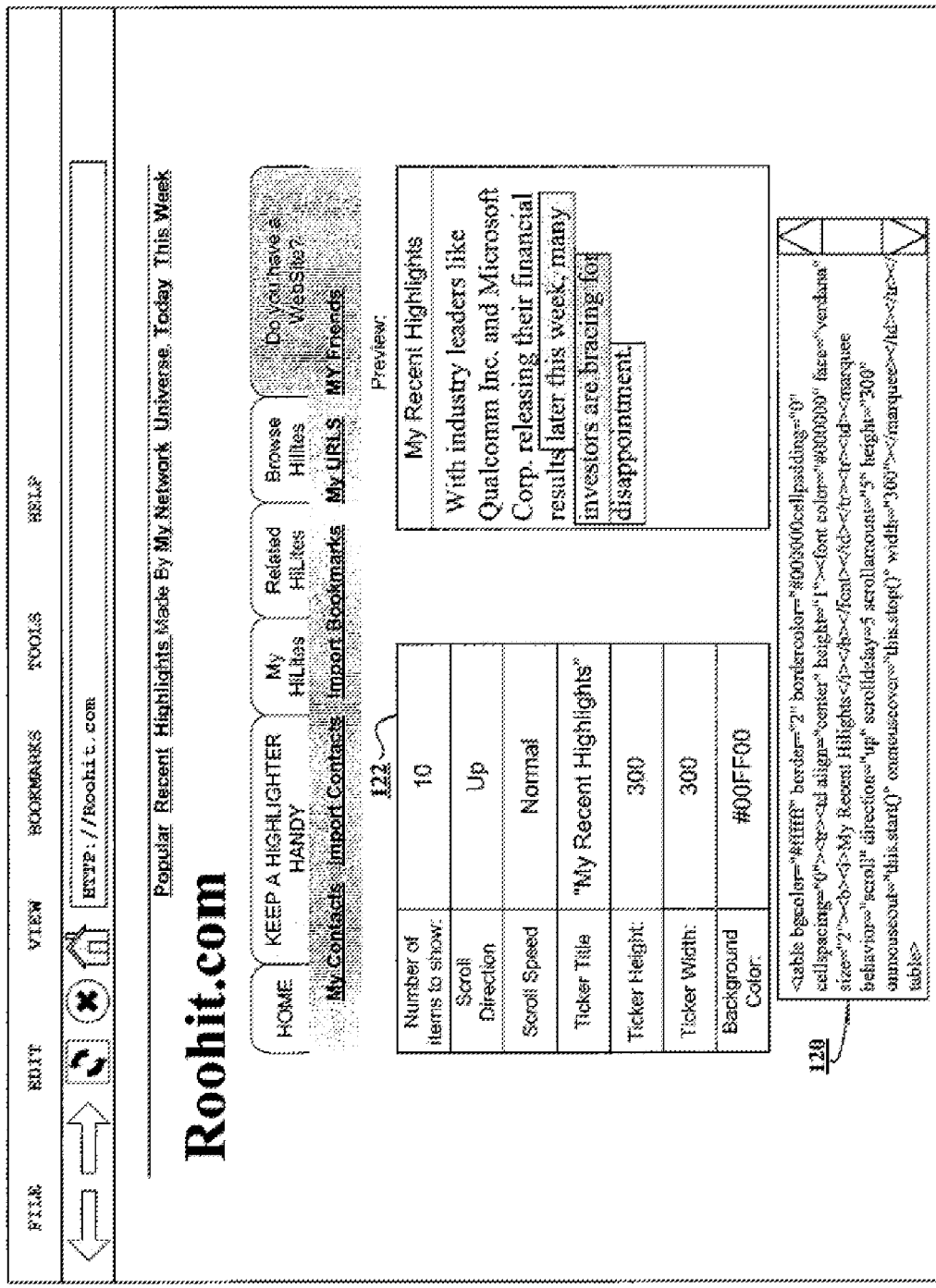
FIG. 13 illustrates an example of a web page providing a snippet of code for adding a highlighter roll to a web page, according to an embodiment of the invention.

FIG. 13 illustrates an example of a web page providing a snippet of code 120 for adding a user interface object, referred to herein as a highlighter roll, to a third-party web page, according to an embodiment of the invention. The snippet of code shown in FIG. 13 can easily be added to another web page by copying and pasting the code. The highlighter roll, once embedded in another web page, will display highlights of a particular user. The code snippet 120 is generated automatically in response to user-specified parameters 122 that are provided at one or more user interface input mechanisms (e.g., drop down lists, text entry boxes, and so on). Accordingly, the highlighter roll can be configured to show a particular number of previous highlights, scroll highlights up or down, scroll at variable speeds, and display the highlights in various user-selected formats. In one embodiment of the invention, the highlighter roll may query the highlighting service to receive a predetermined number of the most recent highlights by a user, by a group, or by everyone, or based on a particular topic, or by a grouping of particular websites or URLs. By inputting various configuration parameters, a user can display a preview of what the highlighter roll will look like when embedded in a third-party web page.

FIG. 14 illustrates an example of a web page with a user interface object referred to herein as a highlight roll 126, according to an embodiment of the invention. As described in connection with FIG. 13, the code for displaying a highlight roll 126 may be automatically generated by a highlighting service web portal, such that a blogger or another web author can easily copy and paste the code into his or her own web page, thereby adding the highlight roll 126 to his or her web page and enabling the display of user-generated highlights. As illustrated in FIG. 14, the highlight roll has a title, "JANE DOE'S HIGHLIGHTS:" as well as a text box 126 where highlights are displayed. The title is easily configurable by providing a configuration parameter as described in connection with FIG. 13. In various embodiments of the invention, multiple highlights may scroll up or down in the text box. In one embodiment of the invention, the highlights will automatically and dynamically update as a user continues to highlight new objects on new internet documents. Accordingly, a highlight roll 126 provides an excellent means of displaying a user's recent web activity, to the extent that a user's highlighting activity represents his or her web activity. A highlight roll may be particularly useful on blogging websites, but also on news websites, corporate websites, social networking websites, and others.

In one embodiment of the invention, a query is used to select the particular highlights from a highlighting service that are to be displayed in a highlight roll. Accordingly, the selection parameters for the query may be configured by a user, such that a wide variety of highlight characteristics can be used to select the particular highlights to be displayed in a highlight roll. In one embodiment of the invention, a highlight roll may be configured to display highlights from a particular user, or group of users. In another embodiment, the highlight roll may be configured to randomly query the highlighting service for user-generated highlights. In yet another embodiment, the highlight roll may be configured to query the highlighting service for highlights that were made on a particular internet document, website, or group of websites. In another embodiment of the invention, the highlight roll may be configured to query the highlighting service for highlights that contain a particular key word or words. In yet another embodiment, the highlight roll may be configured to query the highlighting service for highlights of images.

In one embodiment of the invention, a highlight roll may be used on a blog website. For example, a blogger may use a highlight roll to enhance the content on his or her blog site. Alternatively, the highlight roll may take the place of a blog altogether. For example, by displaying a highlight roll in place of a blog, a user may author blog entries by simply highlighting portions of other internet documents, and then providing comments about the highlighted portions of the document. Those skilled in the art will appreciate that a highlight roll may be used in other contexts not specifically addressed herein.

Search and Relevance

Consistent with one embodiment of the invention, a search engine receives a search query specifying one or more keywords or search terms. The search engine processes the search query by identifying internet documents that satisfy the search query. For example, the search engine may process the search query by identifying those documents that include one or more of the search terms. In addition, the search engine orders the internet documents that satisfy the search query based in part on a document relevance score assigned to each internet document, where the document relevance score (referred to herein as a Highlight Rank) is based on an analysis of user-generated highlights associated with the internet documents.

In various embodiments of the invention, the particular analysis of the user-generated highlights, which is used to rank or rate document relevance in a search, may vary. For example, in one embodiment of the invention, the document relevance score is assigned to each document based on how many times the internet document has been highlighted. In another embodiment of the invention, the document relevance score is assigned based on the number of unique users who have made a highlight in the internet document. In yet another embodiment of the invention, the document relevance score is determined in connection with a particular keyword or words appearing in the internet document. For instance, the document relevance score may be based on the number of times a particular keyword or words have been highlighted in the document.

In yet another aspect of the invention, data associated with highlights may be used as a search parameter, and/or to rate or rank the relevance of a document, or a portion thereof. For example, in one embodiment of the invention, the highlighting service which enables the creation of highlights may also allow users to associate comments with the highlights. Accordingly, a search may be performed to locate a particular search term within a comment that is a associated with a highlight. Similarly, the number of comments associated with a highlight, particularly a certain word that has been highlighted, may be an indication of the document's relevance with respect to search terms that include the highlighted word. Accordingly, a document with a highlight that has many comments may, in one embodiment of the invention, be assigned a higher document relevance score.

In yet another aspect of the invention, searchers may specify the source of a highlight or a comment associated with a highlight as a search parameter for a search query. For example, a searcher may be interested only in documents that have been highlighted by, or include comments from, a particular source—such as a particular user or person, a person within the searcher's social network, and/or a member of a particular group.

In various embodiments of the invention, other attributes and characteristics of a highlighting service may be used as search parameters in a search query, or as data for weighting, ranking or rating a document's relevance. For instance, a highlighting service may enable users to rate or rank other user's highlights or comments. The rating or ranking may be as simple as selecting a number on a scale, such as one to five, or one stars through five stars. Alternatively, a highlight or comment may be marked as a favorite by a user. Accordingly, a searcher may specify as a search parameter a particular ranking or rating associated with a highlight or comment. For example, a searcher may perform a search only for documents containing highlights that have an aggregate user rating equal to or above some threshold rating. Similarly, the ranking or rating information may be aggregated such that all user rankings or ratings associated with a document, highlight, or comment may be used to determine the relevance of a particular object (e.g., the document, highlight or comment). Other aspects of the invention are described in detail below.

FIG. 15 illustrates an example of an internet document with user-generated highlights, according to an embodiment of the invention. As illustrated in FIG. 15, two user-generated highlights (e.g., highlights 210 and 212) have been made within the internet document. Those highlights include the two text strings: "later this week, many investors are bracing for disappointment," and "downgrade of Boeing Co." A method and system for generating such highlights are described in other sections of this document. Although FIG. 15 provides an example of highlighted text, in one embodiment of the invention, other objects shown in an internet document or web page may be highlighted as well. An internet document may be a publicly available document, or a document from an intranet.

Referring again to FIG. 15, in accordance with an embodiment of the invention, a user can perform a search to locate internet documents, or web pages, which include search terms in highlighted portions of the document. Accordingly, if user A is responsible for the highlighted portions of the web page illustrated in FIG. 15, the highlights made by user A are available to be searched by any user. For example, user B may perform a search for all documents that contain the search term "BOEING" in a highlighted portion of the document. In this case, a link to the web page illustrated in FIG. 15 would be provided as a search result to user B's search.

In another aspect of the invention, highlights are analyzed in the aggregate. That is, highlights made by all users of a highlighting service may be analyzed in the aggregate to determine a document's relevance. For example, if numerous user's highlight the same word, phrase or passage in a particular document, the document may be particularly relevant with respect to searches having search terms found in the highlighted portion of the document. Consequently, tallying the total number of times a particular word or words are highlighted in a particular document can be used to provide a measure of that document's relevance with respect to that key word or words. By using information mined from user-generated highlights, search engine accuracy can be improved.

Figure 16:
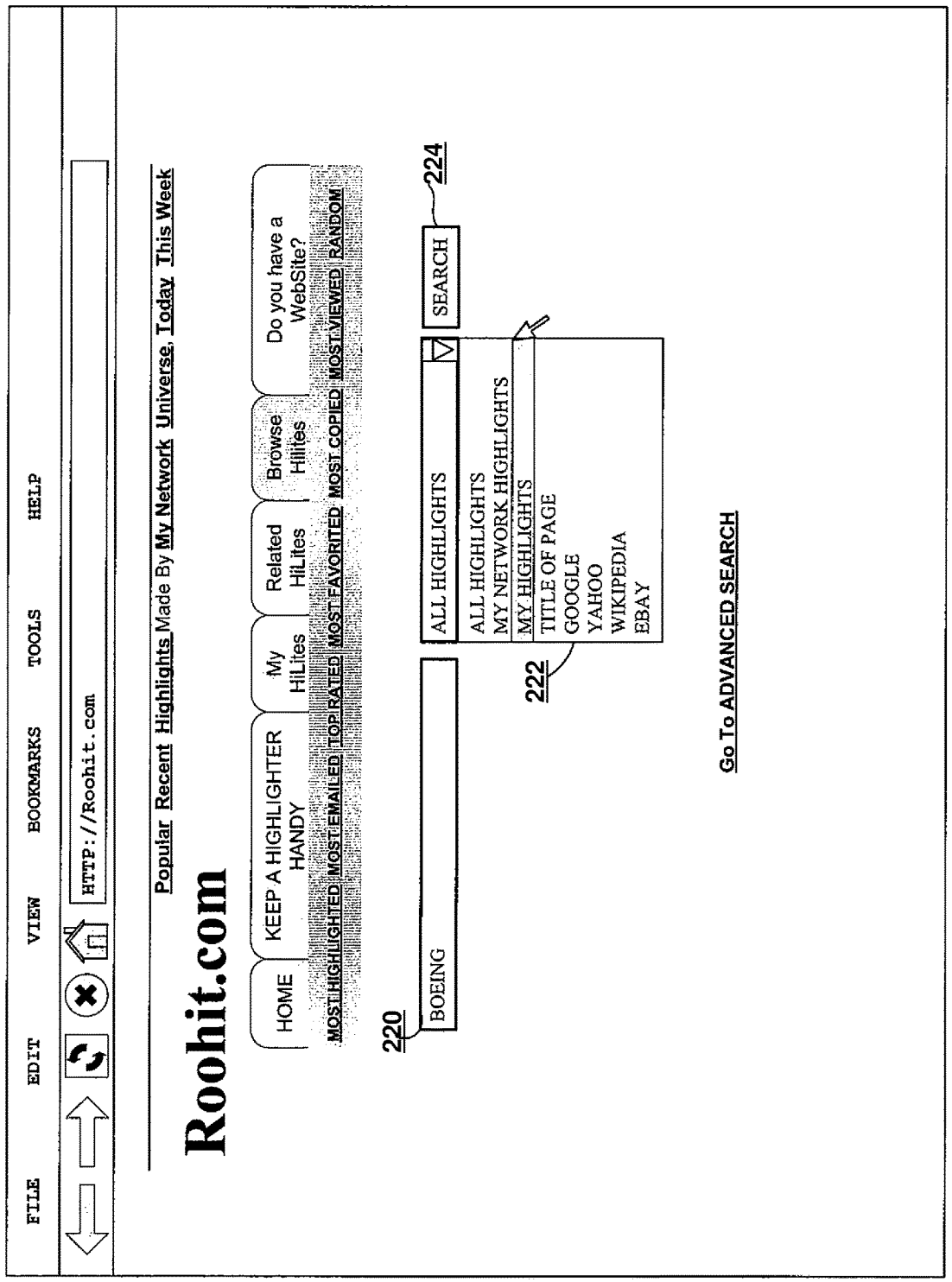
FIG. 16 illustrates an example of a web page providing a search interface, according to an embodiment of the invention.

FIG. 16 illustrates an example of an internet document, or web page, providing a search interface, according to an embodiment of the invention. As illustrated in FIG. 16, the search interface is associated with a highlighting service web portal. Accordingly, in one embodiment of the invention, a search engine or search service may be tightly integrated with a highlighting service, such that each service operates within the same domain if not on the same server. However, in an alternative embodiment of the invention, the search algorithms and methods described herein may be implemented in any number of search engines including a general search engine, or an enterprise search engine configured specifically for a particular topic or subject matter. Moreover, in one embodiment of the invention, a general or enterprise search engine may query a highlighting service for select data used in assessing document relevance. For instance, a search engine may use an application programming interface to query a highlighting service for data generated by and stored at the highlighting service. Such data may be used to enhance and/or improve search engines operated by other enterprises.

In general, a user (e.g., a searcher) performs a search by specifying one or more search terms and/or parameters. Referring again to FIG. 16, for example, a searcher may perform a search by inputting search terms in text input box 220 and selecting the "SEARCH" button 224. In addition, the searcher may specify other search parameters. For example, as illustrated in FIG. 16, in drop down box 222 a searcher can specify a location in which to search for the particular user-specified search terms. In one embodiment of the invention, a search can be performed to locate documents that include the search terms within a highlighted portion of the document. For instance, by specifying in drop down box 222 to run the search for "ALL HIGHLIGHTS" a user can find all documents that include the search term "BOEING" within a highlighted portion of the document.

Alternatively, a user may wish to narrow the search by specifying that the search term be located within highlights that were made only by members of the searcher's network. In various embodiments of the invention, different mechanisms may be used to build out and determine who is in a particular searcher's network. In any case, by specifying something like "MY NETWORK HIGHLIGHTS" in drop down box 222, a user can search for documents which contain the search term in a highlight made by a member of the searcher's network.

In addition, a searcher may specify that the search is to be executed only against the searcher's own highlights. For example, by specifying "MY HIGHLIGHTS" in the drop down box in FIG. 16, the searcher can search for documents that include the search term "BOEING" in a portion of a document previously highlighted by the searcher.

The drop down box 222 in the search page of FIG. 16 provides a variety of other examples of search parameters that may be specified by a searcher, according to an embodiment of the invention. For example, a searcher may specify that the search term is to be located within the title of a highlighted page (e.g., by specifying "TITLE OF PAGE"). In yet another example, the searcher may specify what domain a target document with a highlight should be located within. For instance, a user may specify that the search term be found in a highlighted portion of a document that is hosted at a particular domain, such as Wikipedia, or eBay. In various embodiments of the invention, the drop down box 222 illustrated in FIG. 16 may be customized with any number of other search parameters. Furthermore, those skilled in the art will appreciate that the search parameters illustrated in FIG. 16 may be implemented with a wide variety of alternative user interface objects consistent with the invention, and that the drop down box 222 illustrated in FIG. 16 is simply one example.

Figure 17:
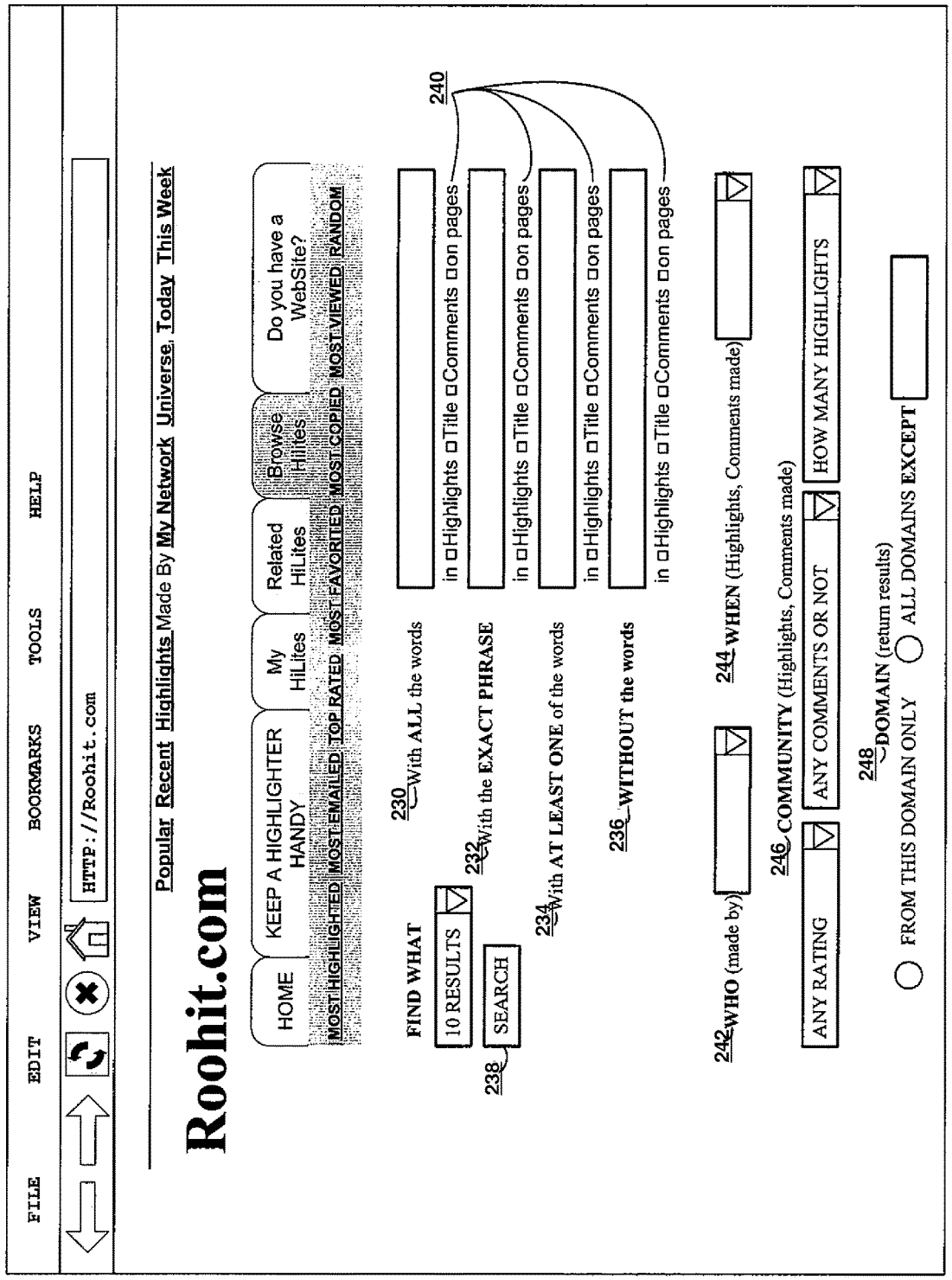
FIG. 17 illustrates an example of a web page providing an advanced search interface, according to an embodiment of the invention.

In one embodiment of the invention, a great number of other search parameters may be specified for an advanced search. FIG. 17 illustrates an example of an internet document, or web page, providing an advanced search interface, according to an embodiment of the invention. As illustrated in FIG. 17, several text input boxes are provided (e.g., text input boxes associated with reference numbers 230, 232, 234 and 236), thereby enabling a searcher to select a particular type of search. For example, by entering search terms in the text box with reference 230, a search can specify that all of the search terms are required to be found in the target objects. Similarly, by entering search terms at text box 232, the searcher can specify an exact phrase as a search term. By using text boxes 234 and/or 236, a searcher can specify that the target object include at least one search term, or none of the search terms. In this case, the type of the target object is set by checking one or more of the target location boxes 240 associated with each text entry box (e.g., 230, 232, 234 and/or 236). For instance, a searcher can perform a search for internet documents that include certain user-specified search terms within such targets as 1) a highlighted portion of the internet document, 2) a title of an internet document, 3) a comment associated with a highlighted portion of an internet document, and/or 4) a web page or internet document. For instance, by entering a search term (e.g., BOEING) in the text entry box associated with reference 230, and checking the box for "on pages", a searcher can perform a search for all documents that include the term "BOEING" in the text of the document. After entering the appropriate search terms, and selecting the target requirements, a searcher simply selects the search button 238 to perform the search.

As illustrated in FIG. 17, other search parameters may be specified as well. For example, the drop down box with reference number 242 enables a user to select a source for the target object. That is, if a searcher is performing a search to find a particular search term within a highlight, then the searcher can specify that the search is to return only those highlights that include the search term and that were made by a particular user, a user from a particular group, or a person within the searcher's network, etc. Similarly, drop down box 244 enables a user to specify when a particular target object (e.g, highlight, comment, etc.) was made. For example, a searcher can specify that only highlights or comments made on or before a particular date, or after a particular date, be returned in the search results.

The drop down boxes associated with reference number 246 enable a searcher to specify a rating associated with a target object. For example, in one embodiment of the invention, users can rate highlights and/or comments. Accordingly, a searcher may be interested in only finding highlights or comments that have an aggregate or overall rating that exceeds some predetermined user-specified level. Similarly, a searcher may specify whether the target object is to have any associated comments or not. For example, a searcher may be interested in only those highlights that have received user comments. A searcher may also specify a particular number of highlights to be included in a target document. For example, the searcher may only want to view internet documents that have been highlighted a certain number of times. Finally, with the radio buttons associated with reference number 248, a searcher may set a search parameter controlling the domains that are searched. For instance, another search parameter that may be controlled via the advanced search interface is the domain associated with the target object. A searcher may specify that the search only return documents from a particular domain, or from all domains except a particular domain.

Figure 18:
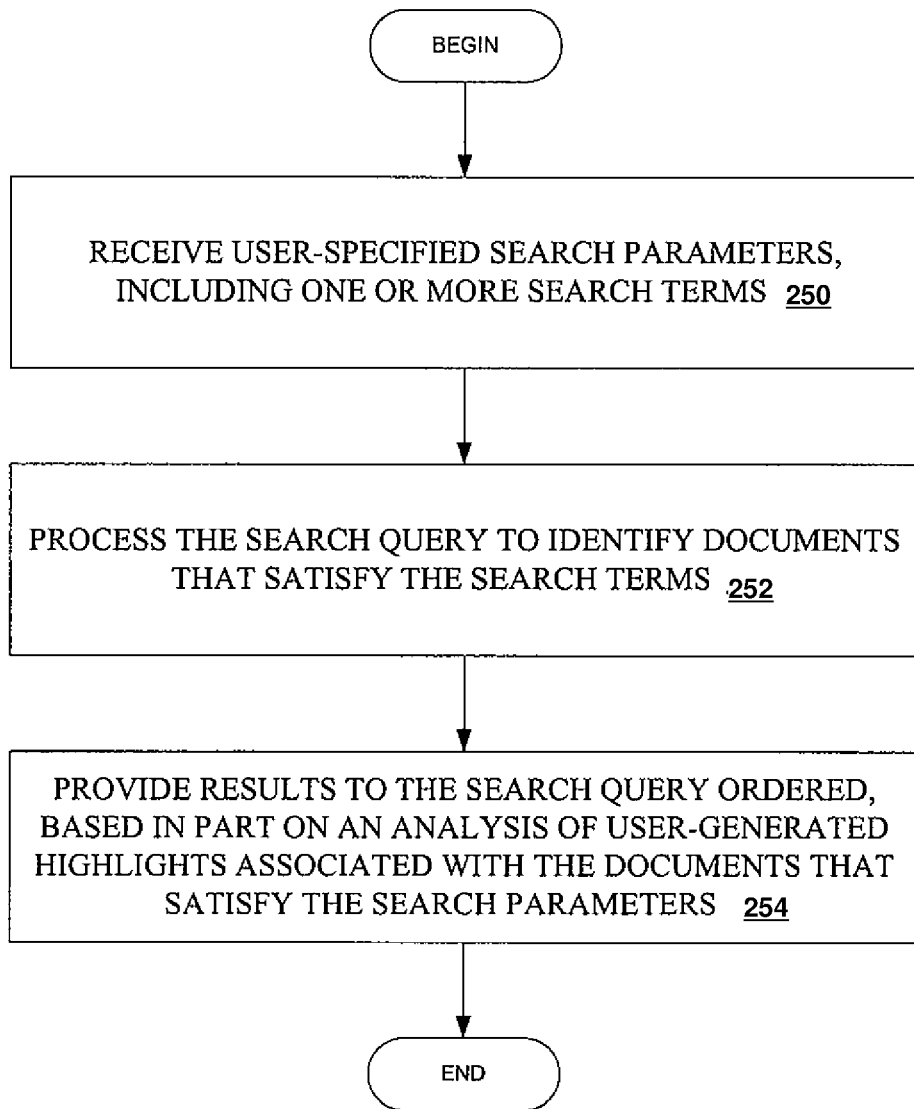
FIGS. 18 and 19 illustrate methods, according to embodiments of the invention, for ordering internet documents to be listed in the search results of a search query; and, FIG. 20 illustrates a method, according to an embodiment of the invention, for assigning a document relevance score (e.g., highlight rank) to one or more documents, based on an analysis of user-generated highlights on the one or more documents.

FIG. 18 illustrates a method, according to an embodiment of the invention, for providing search results to a search query. At method operation 250 a search engine receives user-specified search parameters for a search query. For example, the search parameters may include any of those described above in connection with FIGS. 16 and 17, to include (but not be limited to): search terms (e.g., keyword(s)), domain associated with a document, source of a highlight or comment included in a document, user-rating of a highlight in a document, and so on. At method operation 252, the search engine processes the search query to identify those documents that satisfy the search parameters. Finally, at method operation 254, the search engine provides the search results in an order based in part on an analysis of user-generated highlights associated with the documents that satisfy the search parameters.

According to the method illustrated in FIG. 18, the set of internet documents to be searched may include both documents with and without user-generated highlights. In one embodiment of the invention, method operation 254 orders the documents satisfying the search parameters such that the documents that have highlights are listed prior to any documents that have not been highlighted. Alternatively, in one embodiment, only the documents that have highlights are listed in search results. For example, by default, a document must have been highlighted to be included in a list of search results, thereby reducing the overall number of documents that are listed in any given set of search results.

Figure 19:
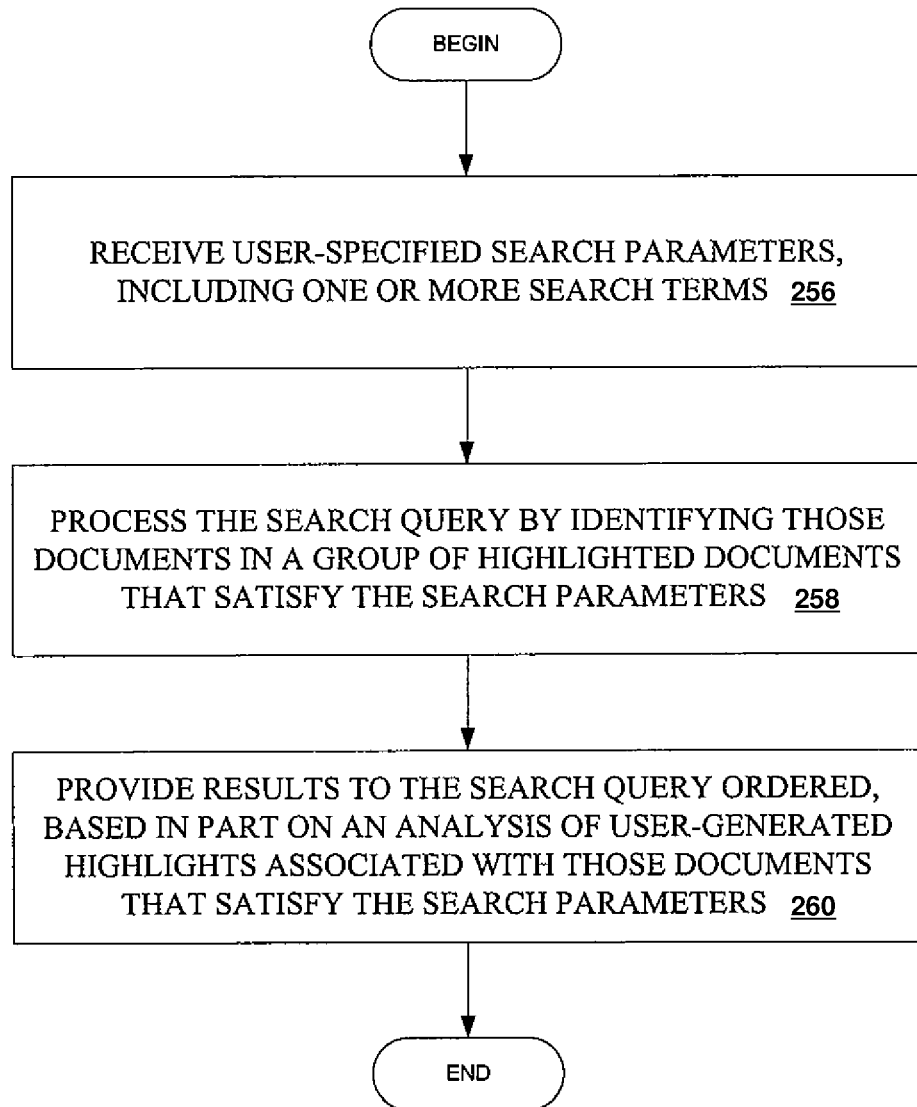

In an alternative embodiment of the invention, the search engine may target only those documents that have user-generated highlights. For example, as illustrated in FIG. 19, one method for providing search results to a search query begins at step 256 when a search engine receives user-specified search parameters including one or more search terms. At step 258, the search query is processed by identifying those documents from a group of previously highlighted documents that otherwise satisfy the search parameters. For example, the universe of documents to be searched is limited to those documents that a user has already highlighted. Finally, at step 260, the results of the search query are provided in an order that is based, in part, on an analysis of the user-generated highlights.

Figure 20:
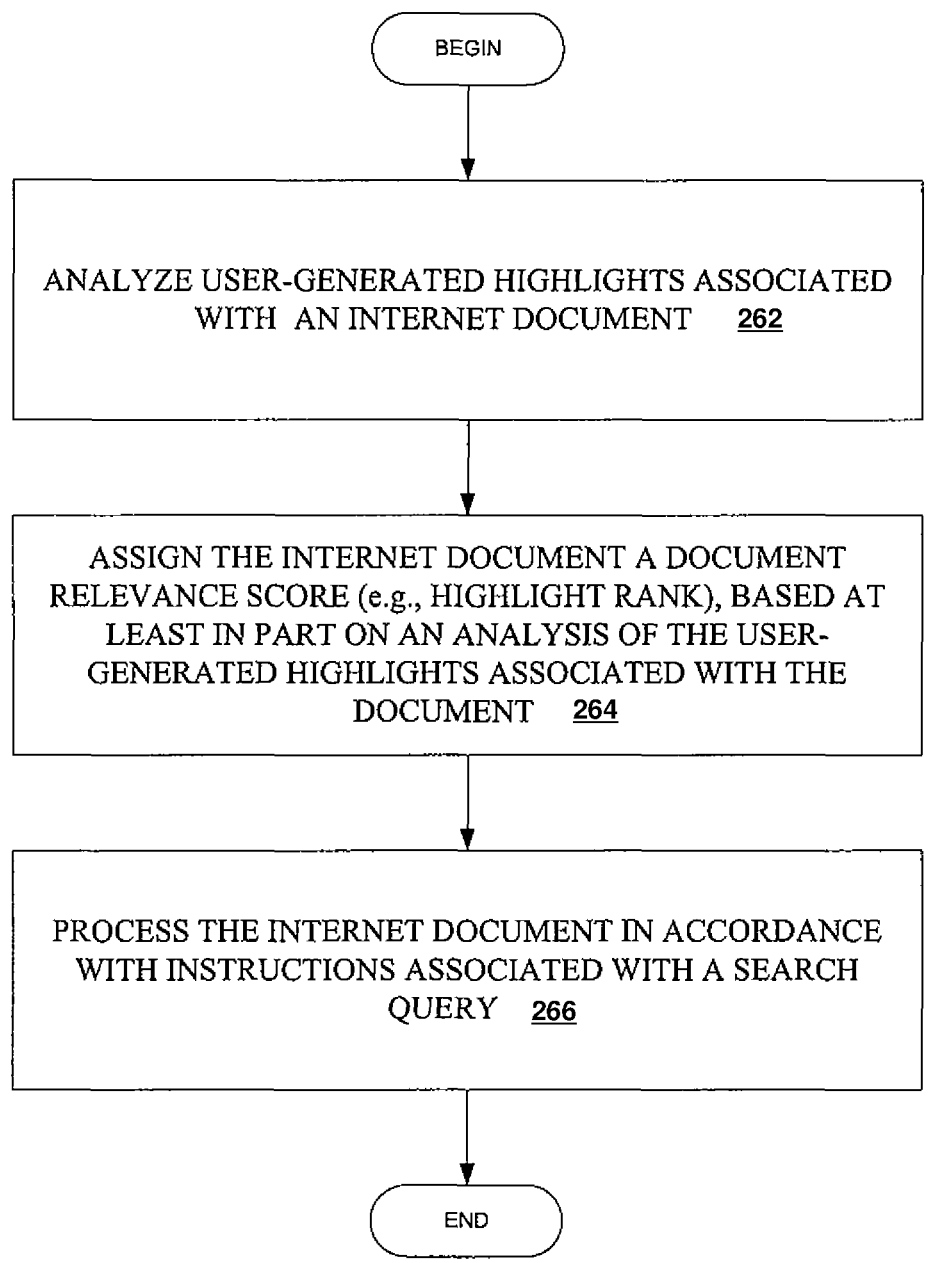

FIG. 20 illustrates a method, according to an embodiment of the invention, for assigning a document relevance score (e.g., Highlight Rank) to an internet document based on an analysis of user-generated highlights associated with the document. At method operation 262, the user-generated highlights associated with an internet document are analyzed in accordance with a document relevance algorithm. A variety of algorithms may be used. For example, the number of highlights associated with each individual document may be tallied. The number of comments associated with each highlight of the document may be tallied. Alternatively, the highlighted text on each document may be analyzed such that a count indicating how frequently each word or term on a particular document has been highlighted is performed. The number of unique users who have generated a highlight on the document may be calculated.

At method operation 264, a document relevance score (e.g., Highlight Rank), which is determined at method operation 262, is assigned to the document. The document relevance score may be based directly on any one of the measures described above (e.g., number of highlights, number of comments, etc.), or some combination of such measures. For instance, one or more of the above described measures may be weighted, and then combined in some manner to arrive at an overall document relevance score, referred to as a Highlight Rank. Finally, at method operation 266, the document is processed in accordance with instructions associated with a search query. For example, the document may be positioned in the search results of a search query based in part on its document relevance score or Highlight Rank, prior to being returned or displayed to a searcher.

Consistent with an embodiment of the invention, the level of significance of an object or document is determined based on an analysis of user-generated highlights, or data associated with user-generated highlights. For example, in one embodiment of the invention, the level of significance of an internet document may be determined in part on the total number of user-generated highlights associated with a particular internet document. In this case, the document relevance score (representing the level of significance) is independent of any search terms, and can be calculated and assigned prior to a search being performed. For example, a tally of user-generated highlights can be kept on an on-going basis. Then, when a search is performed, those documents that satisfy the search can be presented in an order that is based on the predetermined document relevance score of each document.

In another embodiment of the invention, the level of significance of each internet document may be determined based on the number of search terms that appear within a highlighted portion of a document. For instance, internet documents that have been highlighted by a user may be analyzed to determine a count of the number of times each word in the document has been highlighted. Accordingly, as the documents that satisfy a search query are identified, the count of the times that each search term has been highlighted can be used to determine document relevance. Accordingly, the document relevance can be used to order the documents as they are listed or otherwise provided in search results.

In one embodiment of the invention, in addition to analyzing user-generated highlights, document relevance scores are determined based on a wide variety of user-initiated activities associated with documents. For example, the score assigned to a particular document might be based (in whole or in part) on: the number of comments associated with the document, the number of user-ratings associated with a document, an average user-rating associated with the document, the number of relevance flags associated with the document, the number of times the document has been viewed, the number of times the document has been emailed, the number of times the document has been marked as a user favorite, and/or the number of times the document has been copied. Similarly, the document relevance score may be based on one or more of the following: the number of users who have generated highlights on the document; the number of users who have provided comments on the document, or a highlight associated with the document; the number of users who have provided a rating for the document, a highlight associated with the document, or a comment on the document; the number of users who have flagged relevance; the number of users who have viewed the document; the number of users who have emailed the document; the number of viewers who have marked the document as a favorite; and/or the number of users who have copied the document.

In one embodiment of the invention, one or more of the components that comprise the document relevance score may be weighted according to a weighting factor. For instance, in one embodiment of the invention, a user of the highlighting service may be assigned a user rating or score, based (in whole or in part) on how other users rank or rate the user, or past highlights or comments made by the user. Accordingly, a highlight or comment made by a user who has a high user rating will carry more weight in determining the document relevance score. For example, a document with several highlights made by users with high ratings will have a greater document relevance score than a similar document with highlights made by users who have low user ratings. In addition, a user's level of activity may play a part in determining his or her user rating, and therefore affect the weight of any highlights or comments made by that user in determining a document relevance score. For instance, in one embodiment, active users who make a relatively large number of comments or highlights may have higher (or lower) user ratings, thereby increasing (or decreasing) the user weighting factor for highlights or comments made by those users. In yet another embodiment of the invention, a highlight or comment may be weighted based on how many people have subscribed to receive highlights from the person who made the highlight or comments. For instance, in one embodiment of the invention, users can subscribe to receive other user's highlights. Accordingly, a user who has been highly subscribed to (e.g., many other users have subscribed to receive the user's highlights) will generally have a greater user rating, and thus, highlights or comments made by that user will carry greater weight in determining a document relevance score. A user's rating may change over time, for example, as other users continually provide new ratings for the user and his or her highlights and/or comments. Furthermore, a user's rating may be different with respect to different subjects and/or objects. For instance, a user may have a rating that is dependent upon, or based upon, highlights the user has made to documents in a given domain. Accordingly, the user may have a rating for that domain that is different than his or her rating for other domains. Similarly, a user may have one rating for comments, and another rating for highlights.

In one embodiment of the invention, the document relevance score may be normalized, and then presented with the search results associated with a search query. For example, the document relevance score may be normalized to a number between one and ten, and then displayed along with the document to which it is associated. Similarly, a graphical icon or image may be presented to indicate a summary of the document relevance score. For example, the graphic may be a number of stars, where more stars represent a greater document relevance of higher Highlight Rank. Similarly, the graphic may be a number of highlighter markers, where the number of highlighter markers indicates the overall relevance of the document, based on the analysis of the highlights associated with the document.

In yet another embodiment of the invention, multiple document relevance scores may be determined and displayed. For instance, one graphic or icon may represent a document's relevance as measured under one algorithm, while a second graphic represents the document's relevance as measured under another algorithm. For example, separate graphics or icons may be used to display information about the highlights and comments in the associated documents. One icon may represent the number of comments, while the other icon represents the number of highlights. Other variations will be apparent to those skilled in the art.

In one embodiment of the invention, the search engine may be tightly integrated with the highlighting service that is used to manage the highlights associated with the internet documents. Accordingly, in one embodiment the universe of searchable documents may be only those documents that have been highlighted by a user of the highlighting service. In another embodiment of the invention, the search engine may be operated on a server that is remote from the highlighting server providing the highlighting service. In this case, the highlighting service may be consulted only for purposes of ranking or ordering documents that the search engine has identified as satisfying the search query. Accordingly, the search engine may simply communicate messages (e.g., via an applications programming interface, or API) with the highlighting service to obtain document relevance scores based in part on an analysis of user-generated highlights performed by the highlighting service.

Consistent with an embodiment of the invention, and in contrast to prior art methods for assessing document relevance, the relevance of a document is determined by a potentially large group of users of the document. For example, by highlighting a document, a user is implicitly casting a vote for the document. Accordingly, rather than determine document relevance based on the number of incoming links to a document (which are controlled solely by the authors of documents), document relevance is determined based on user-generated highlights which can easily be generated by users of a highlighting service.

Software as a Service: Highlighter/Content Portion Selection

Consistent with an embodiment of the invention, a graphical user interface object (e.g., a user-selectable button, hyperlink, graphic, icon, banner, text, label, or widget, etc.) displayed on an internet document provides a user with the ability to invoke a highlighting service to operate with the currently displayed internet document. For instance, the graphical user interface object may be a simple button, referred to herein as a Highlight Anywhere Button, or generally as a Highlighter button. When a user selects (e.g., with a mouse or pointing device) the button, executable code associated with the button causes a request to be communicated to a highlighter server hosting a highlighting service. In one embodiment of the invention, the request includes the address or uniform resource locator (URL) of the currently displayed internet document. Accordingly, the highlighter server responds to the request by enabling the highlighting service with the currently displayed internet document, thereby enabling a user to highlight portions of the currently displayed document for later retrieval and/or sharing.

Figure 21:
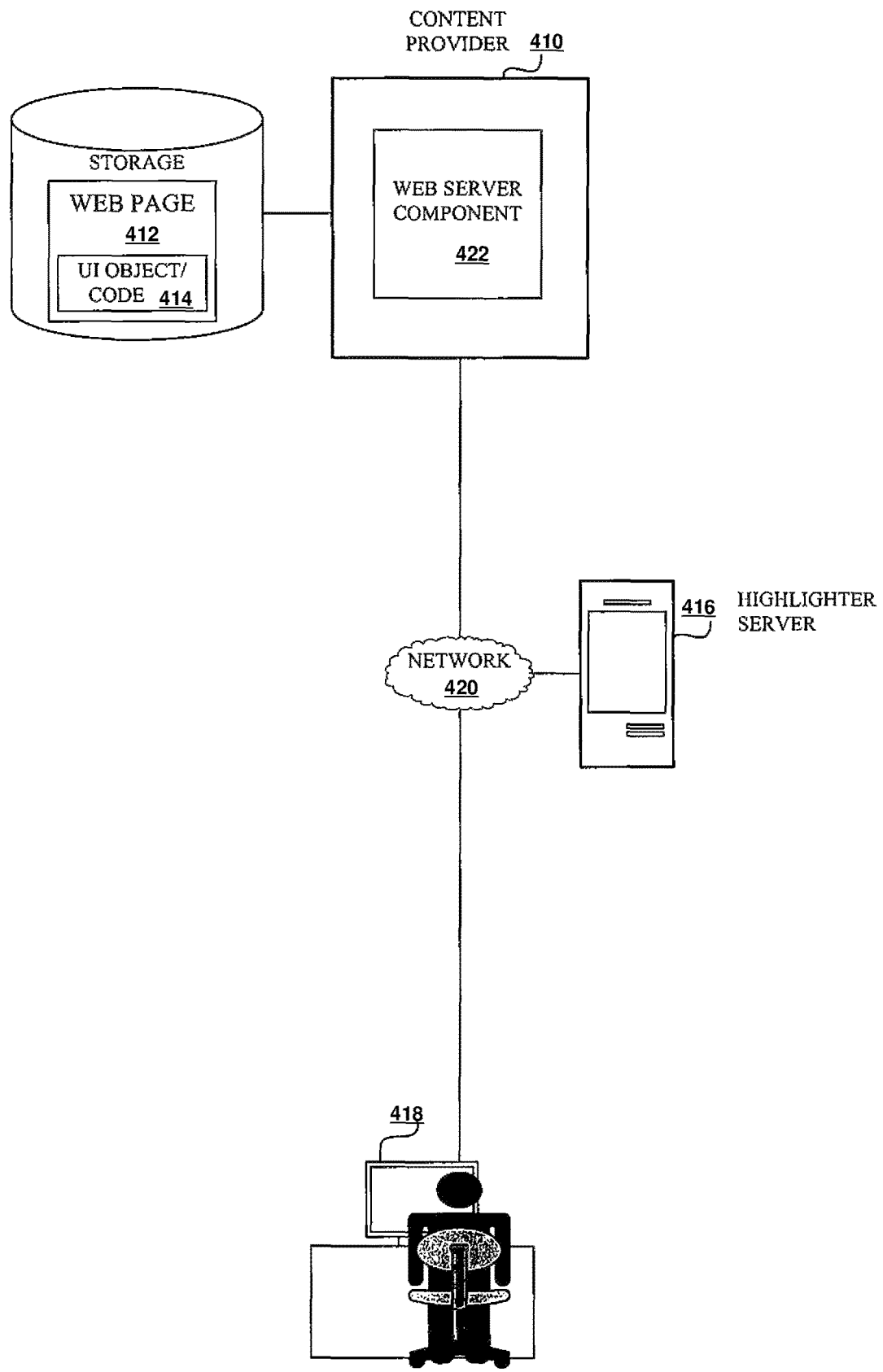
FIG. 21 illustrates an example of a network environment including a content provider for serving a web document with a user interface object for directly invoking a highlighting service, according to an embodiment of the invention.

FIG. 21 illustrates an example of a computer network environment including a content provider server 410 for serving an internet document or web page 412 with a Highlighter button 414, and a highlighting server 416 configured to provide a highlighting service, according to an embodiment of the invention. As illustrated in FIG. 21, the highlighter server 416 is communicatively coupled by means of a network 420 to a content provider server 410. In addition, the highlighter server 416 is communicatively coupled by means of a network 420 to a user's client computer 418. The content provider server 410 includes a web server component 422 for serving various internet documents and related objects, including a user interface object consistent with an embodiment of the invention. As illustrated in FIG. 21, the content provider server 410 is illustrated as a single device. However, those skilled in the art will appreciate that in alternative embodiments, the content provider may include several servers working in conjunction with one another in a distributed manner to respond to document requests by serving documents and related objects from storage. Furthermore, in an alternative embodiment of the invention, the highlighting service may execute on the content provider server, or another server under the control of the content provider.

In general, a user utilizes a web browser application on client computer 418 to access and display content in the form of internet documents or web pages, which may be stored in whole or in part on the content provider server 410. The content provider server 410 serves an internet document or web page 412 that includes a user interface object for invoking a highlighting service. That is, the web page 412 served by the content provider server 410 includes a Highlight Anywhere Button, consistent with an embodiment of the invention, which, when displayed in a web browser application and selected by a user, causes a highlighting service to be invoked with the web page 412.

Once a highlighter session has been invoked, a user has at his or her disposal a variety of tools for highlighting text and objects of the web page 412. For instance, in one embodiment of the invention, a highlighter tool panel will appear in the web browser window and provide the user with a selection of controls enabling various features and functions of the highlighting service. In another embodiment of the invention, various controls may be provided by a highlighter toolbar. In any case, the basic function of the highlighting service is to enable a user to highlight an object (e.g., text, graphical images, or a combination) of the web page 412, such that the highlighted portion(s) can easily be recalled at a later time and/or shared with other users. Accordingly, as the user highlights an object, the highlighted object, or portions thereof, are communicated to the highlighter server 416 where it may optionally be stored. In one embodiment of the invention, the highlighted object (e.g., a selection of text) is stored along with any annotations the user may have added, as well as a date and time indicating when the highlight was generated. The highlighted object and its associated data are stored in such a manner as to be optionally associated with the user who generated the highlight. This allows the user to recall and view highlights from previous highlighting sessions. Other aspects and features of the highlighting service are described in various sections of this document.

Figure 22:
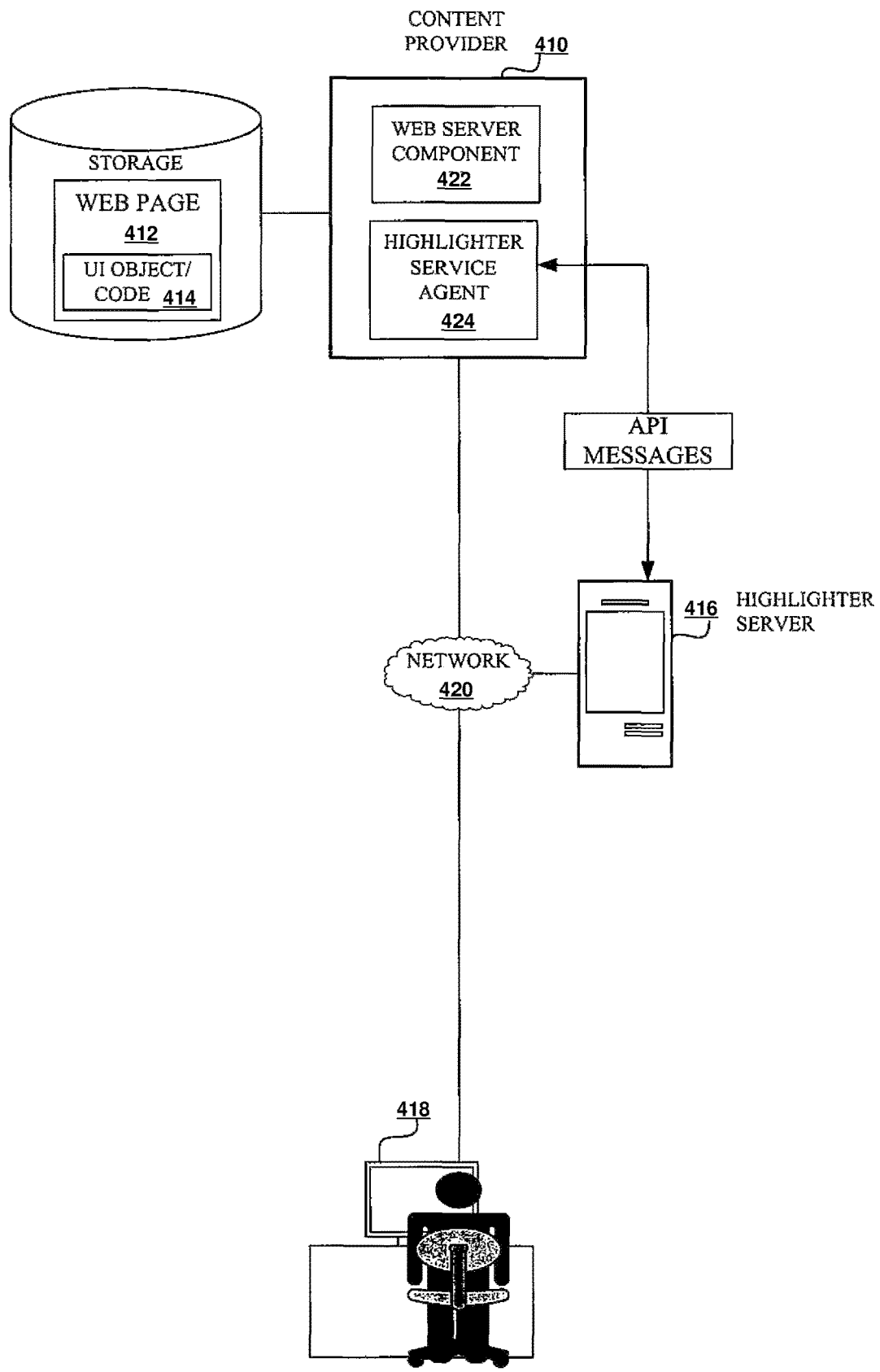
FIG. 22 illustrates an example of a network environment including a content provider with a software agent for indirectly invoking a highlighting service via a system of application programming interface (API) calls, according to an embodiment of the invention.

As illustrated in FIG. 21, when a user invokes the highlighting service by selecting the Highlighter button on the web page in his or her browser, the browser communicates a request directly to the highlighter server 416. As illustrated in FIG. 22, in an alternative embodiment of the invention, the content provider server 410 includes a highlighter service agent, which works in conjunction with the web server component 422 to communicate messages (e.g., API messages) to the highlighter server 416. Accordingly, when a user selects a Highlighter button to invoke a highlighting service, a request is communicated from the client browser 418 to the content provider web server component 422. In turn the request is handled by the highlighter service agent 424, which communicates an API call to the highlighter server 416, thereby invoking the highlighting service.

In one embodiment of the invention, the highlighter service agent 424 is provided by the operator of the highlighting service to the enterprise. For example, the highlighting service operator may configure the highlighter service agent 424 to be integrated with and work with the content provider's server as well as the highlighting service. Accordingly, the highlighter service agent 424 can be customized to support and provide those highlighting features desired and requested by a particular enterprise. For instance, an enterprise offering a news website may desire a subset of highlighting service features specific to its website, and different from the subset of features that may be desired and/or requested by an enterprise providing a social networking website. The highlighter service agent 424 can be configured on a per enterprise basis, and enables each enterprise to seamlessly integrate a highlighting service to work with its website.

Although the highlighter server 416 is shown to be a separate node on the network 420, in an alternative embodiment of the invention, the highlighting service provided by the highlighter server may be integrated with, or reside on, the content provider server 410 or another server maintained and/or operated by the content provider.

Figure 23:
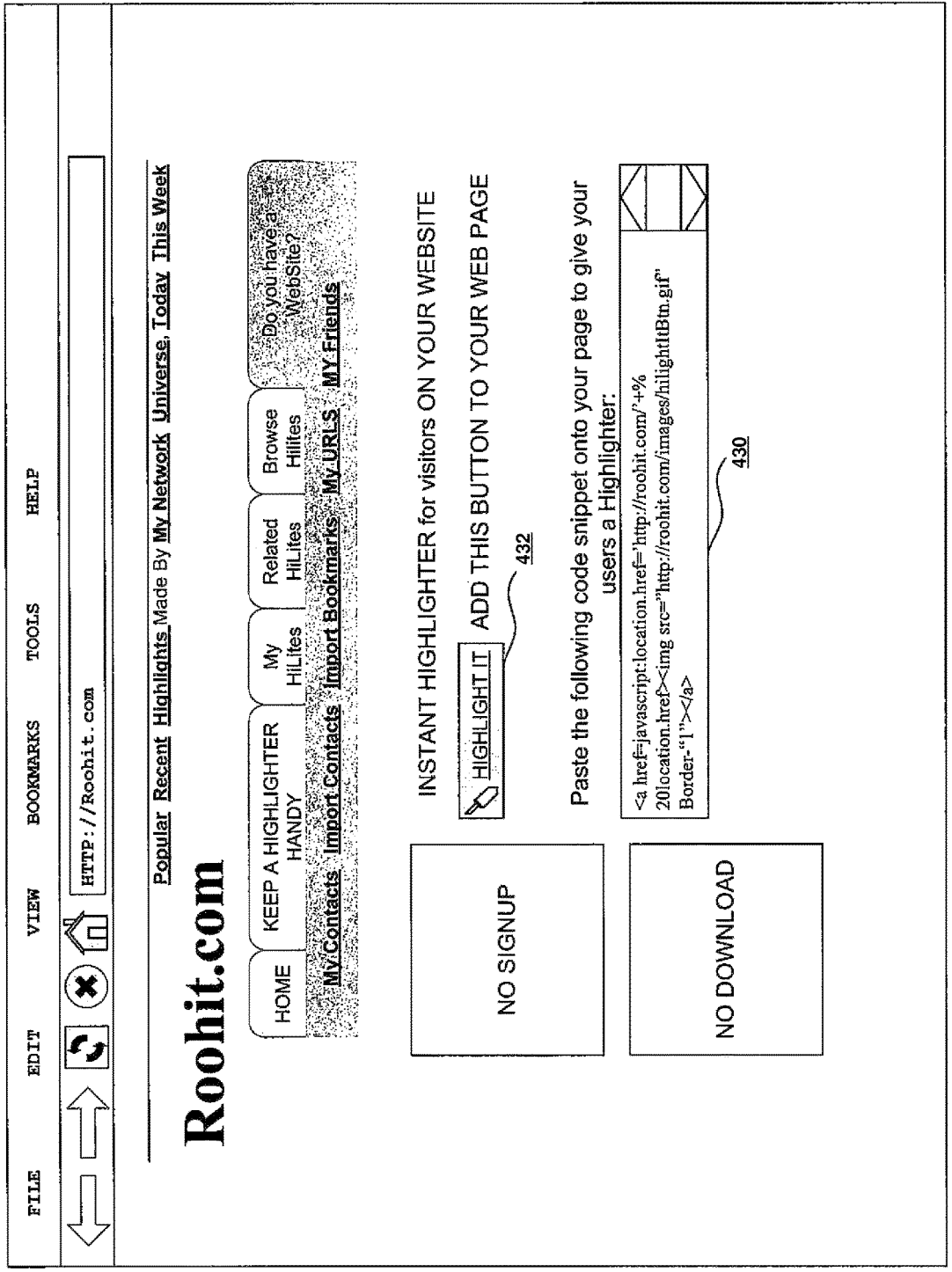
FIG. 23 illustrates an example of a web page providing a snippet of code for adding highlighter functionality to a third-party web page, according to an embodiment of the invention.

FIG. 23 illustrates an example of a web page providing a snippet of code for adding highlighter functionality to a third-party web page, according to an embodiment of the invention. The web page shown in FIG. 23 may be included as part of a web portal for the highlighting service. Accordingly, the highlighting service may simplify the process of providing highlighter functionality on other websites by providing a snippet of code that other content providers and web-based authors can easily copy and paste into their own web pages. As illustrated in FIG. 23, the snippet of code 430 can easily be added to a third party web page by copying and pasting the code.

In one embodiment of the invention, once the code is embedded in a another web page (e.g., the target web page), the code will cause a button, such as the button with reference number 432 in FIG. 23, to be displayed on the target web page when the page is rendered by a web browser application. When a user selects the button, a highlighting session will be invoked, and the user will be able to highlight text and/or objects on the target web page. This provides a simple way for content providers to enhance the functionality and usability of their websites.

In an alternative embodiment of the invention, the code automatically causes the client web browser to invoke a highlighting service, for example, without requiring a user to select or press a user interface object or button on the web page. For example, when the user loads the web page in which the code has been embedded, the client web browser will invoke the highlighting service to work with the web page.

The code snippet 430 illustrated in FIG. 23 may be provided via a web page served by the highlighting service. However, those skilled in the art will appreciate that an operator of the highlighting service may communicate or otherwise provide the code to an enterprise in a number of ways. For example, the code snippet for invoking the highlighting service may be emailed to an enterprise, or provided, for example, by a consultant.

Figure 24:
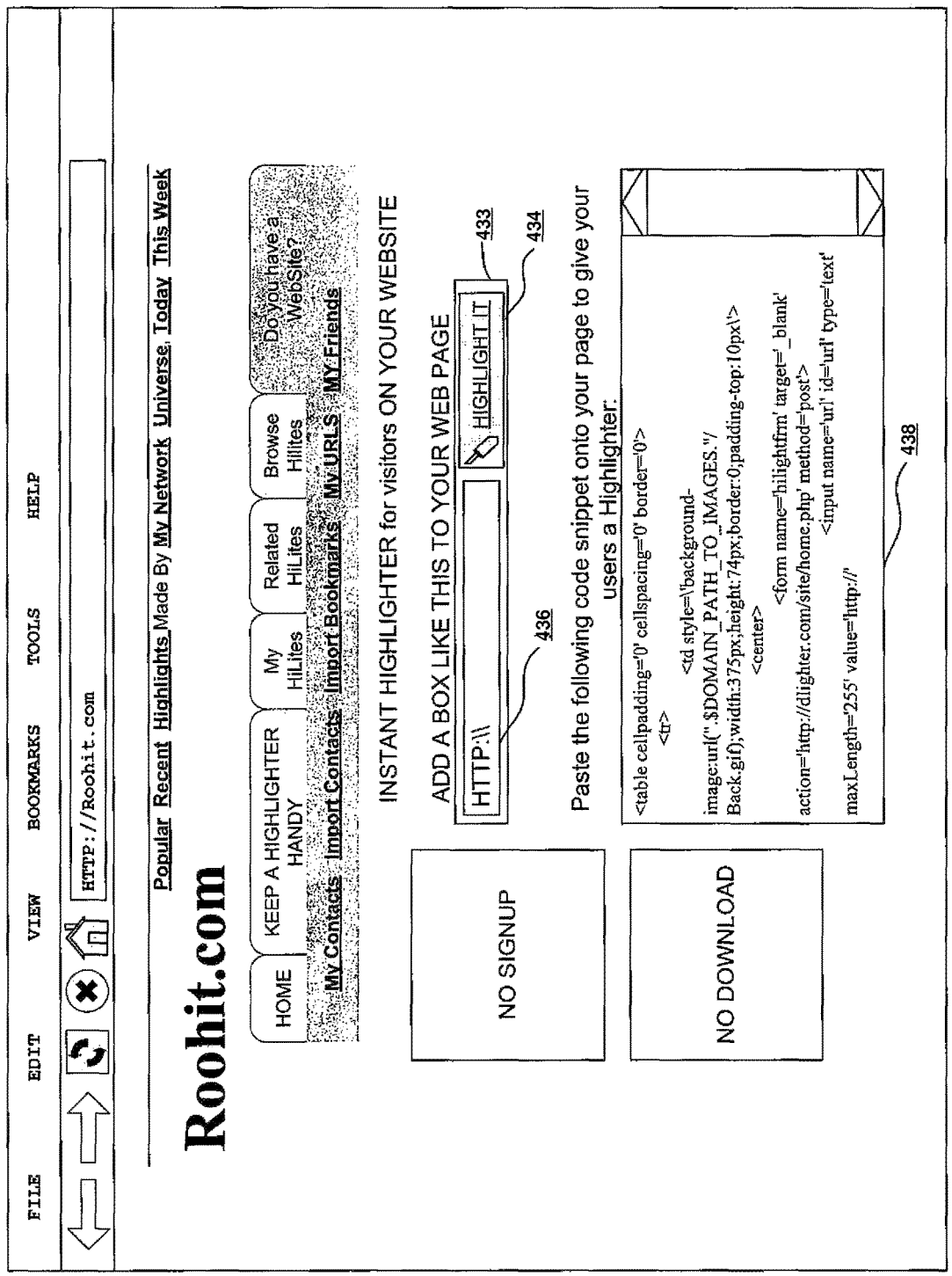
FIG. 24 illustrates an example of a web page providing a snippet of code for adding highlighter functionality to a third party web page, according to an embodiment of the invention.

FIG. 24 illustrates an example of a web page providing a snippet of code for adding highlighter functionality to a third-party web page, according to an embodiment of the invention. The web page illustrated in FIG. 24 is similar to the web page illustrated in FIG. 23, however, the web page of FIG. 24 includes a snippet of code 438 to provide a user interface object (e.g., box 433) including an address bar 436 as well as a highlighter button 434. Accordingly, when the snippet of code 438 is embedded or inserted into another internet document, the internet document will display the box 433, along with the address bar 436 and button 434. This enables a user to enter an address or URL of an internet document and begin a highlighting session. For example, by selecting the button 434, the web browser will load the web page associated with an address entered in address bar 436 enabling a user to create highlights on that web page.

Figure 25:
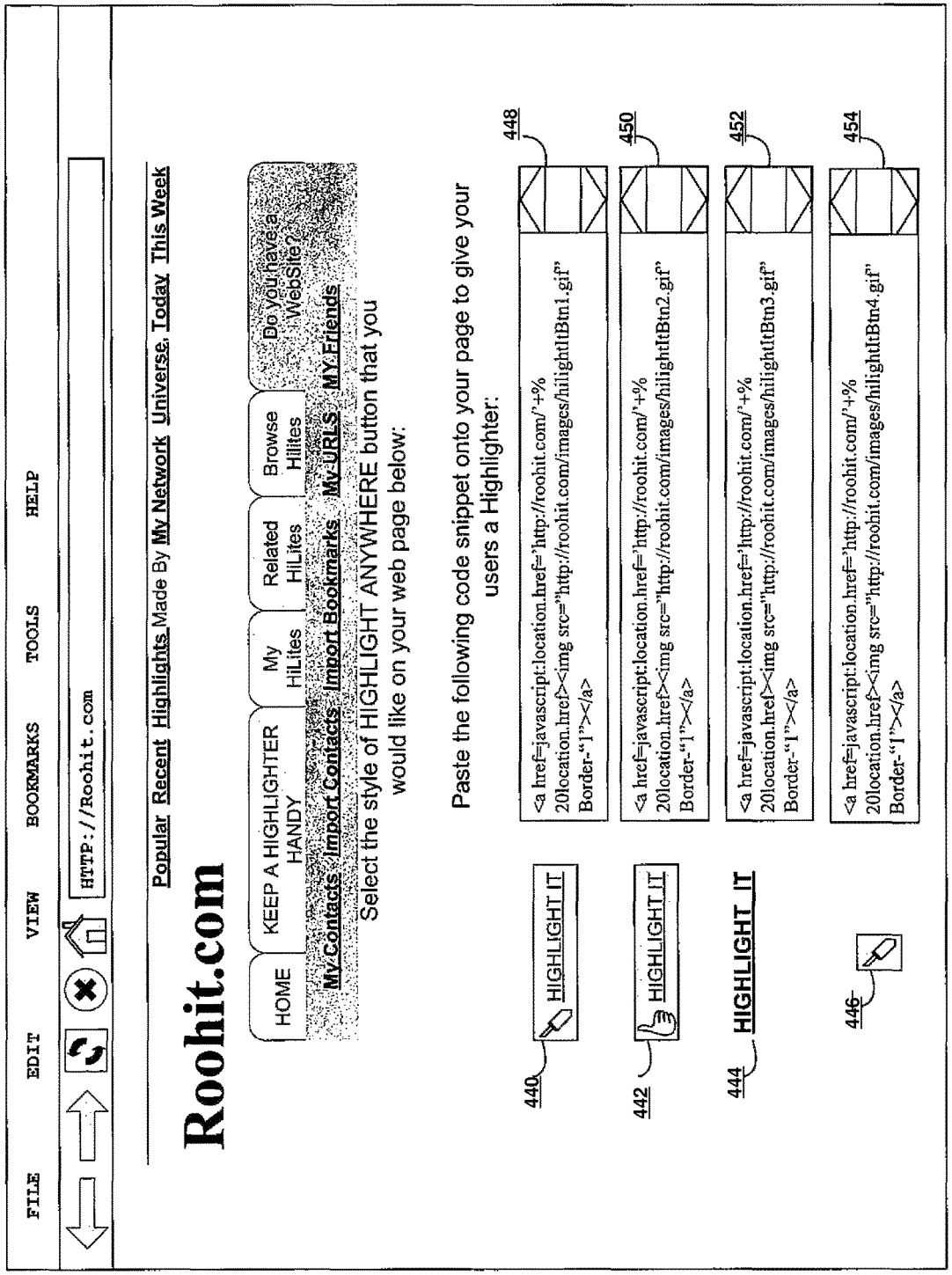
FIG. 25 illustrates an example of a web page providing a selection of user interface objects, which may be used to invoke a highlighting service according to an embodiment of the invention.

FIG. 25 illustrates an example of a web page providing a selection of user interface objects (e.g., buttons, icons, links), which may be used to invoke a highlighting service according to an embodiment of the invention. As illustrated in FIG. 25, the highlighting service may include a web page that provides other content providers with a variety of Highlighter buttons for use with their web pages. Accordingly, the highlighting service may display a variety of user interface objects (e.g., buttons 440, 442, 444, and 446) and a snippet of code (e.g., code snippet 448, 450, 452, and 454) associated with each user interface object. A content provider simply selects the particular style of user interface object he or she would like to include in a web page, and copies and pastes the associated code snippet for that web page into the target web page. Accordingly, the content provider need not get involved with figuring out the appropriate addresses and writing the necessary code to invoke a highlighting service with a web page.

FIG. 26 illustrates an example of a news-related web page with a user interface object enabling highlighter functionality provided by a highlighting service, according to an embodiment of the invention. As illustrated in FIG. 26, a news-related web site with URL www.news.com provides a variety of news articles to its users. In addition, a variety of user interface objects enable or allow other functions, such as emailing a link of a particular news articled to another user, or formatting a news story to be printed. Consistent with an embodiment of the invention, a user interface object—for example, the "Highlight It" button 460—provides users with a simple mechanism for invoking a highlighting service to work with the web page that is currently being displayed. By simply selecting the "Highlight It" button 460, a request is communicated to the highlighting service hosted at the highlighting server 416, thereby invoking the highlighting service. The request may be communicated directly (e.g., from the web browser to the highlighting service) or indirectly (e.g., via a highlighter service agent operating in conjunction with the content provider's web server). In any case, the highlighting service allows users to highlight objects (e.g., text and/or images) on the currently displayed web page, along with a variety of other related features and functions. In one embodiment of the invention, highlights can easily be shared with other users. Consequently, the "Highlight It" button makes it easy for one user to highlight and share a particular passage in a news article with another person.

FIG. 27 illustrates an example of a blog web page with a user interface object 462 enabling highlighter functionality provided by a highlighting service, according to an embodiment of the invention. Like the user interface object 460 of FIG. 26, the "Highlight It" button 462 on the blog web page of FIG. 27 provides a simple mechanism for invoking a highlighting service to work with the currently displayed web page. Accordingly, a user can easily invoke a highlighting service to share a blog entry, or a portion of a blog entry, with another person.

Finally, FIG. 28 illustrates an example of a user profile web page including a user interface object 464 for invoking a highlighting service, according to an embodiment of the invention. As illustrated in FIG. 28, the "Highlight It" button enables users of a social networking site to highlight aspects of a user's profile, and share the highlights with others.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. When implemented partly in software, the invention may be embodied as a set of instructions stored on a computer-readable medium. The scope of the invention is defined by the claims and their equivalents.

What is claimed is:

1. A computer-implemented method in a web browser executing on a computing device, without requiring a user of the computing device to install an additional software component, the method comprising the steps of:
receiving a request for an internet document;
serving the internet document to the web browser;
displaying the internet document in the web browser;
enabling a user to select a portion of content within the internet document;
automatically searching for the portion of content selected by the user within a set of pages containing portions of content selected by the user; and
generating a highlight on at least one portion of content satisfying the search for the portion of content selected by the user within at least one page of the set of pages.

2. The computer-implemented method of claim 1, wherein the internet document is a web page, and the portion of content selected by the user is at least one word of text.

3. The computer-implemented method of claim 1, wherein the portion of content selected by the user is matched according to a relevance score.

4. The computer-implemented method of claim 1, wherein a relevance score is determined by using a subset of: matching relevance to past portions of content selected by a one or more users; matching relevance of the user making the selection of the content portion to the one or more other users; matching relevance of the content portion selected by the user with historical usage by the one or more users; and matching the portion of content exactly to the user selected content portion.

5. The computer-implemented method of claim 1, wherein no network connectivity is required in order to match the user selected content portion with portions of content within the internet document.

6. The computer-implemented method of claim 1, wherein the portion of content selected by the user is transmitted to a server and the server identifies matching portions of content to be highlighted in the internet document.

7. The computer-implemented method of claim 1, wherein the portion of content selected by the user is tracked and stored in a storage medium.

8. The computer-implemented method of claim 1, wherein a functionality is provided for the user, or another user, to view a collection of past content portions, wherein the collection is comprised of a subset of past content portions selected by the user, or by one or more users.

9. The computer-implemented method of claim 1, wherein the set of pages, comprises the internet document displayed in the web browser.

10. A computer system containing computer executable instructions on a web browser, executing on a computing device with at least one processor, without requiring a user of the computing device to install an additional software component, and being displayed on a display device for the web browser, comprising:
  instructions for receiving a request for an internet document in the web browser;
  instructions for servicing the request for the internet document; and
  displaying the internet document in the web browser;
  wherein instructions for executing a highlighting functionality, comprising:
    instructions for enabling a user to select a portion of content within the internet document;
    instructions for automatically searching within the internet document for other portions of content matching the user selected portion of content;
    instructions for generating a highlight on at least one of the other portions of content matching the user selected portion of content within the internet document; and
    instructions for displaying a highlight on the at least one of the other matched portions of content in the internet document.

11. The computer system containing computer executable instructions of claim 10, wherein when the highlight is made on a web page that is dynamic, then a highlight insertion logic analyzes the content of the web page to determine where a previously made highlight is to be inserted.

12. The computer system containing computer executable instructions of claim 10, wherein an application programming interface (API) module provides a common interface for communicating messages with a third-party add-on, or a software agent.

13. The computer system containing computer executable instructions of claim 10, wherein the computing device locally matches the user selected content portion with the other portions of content in the internet document.

14. The computer system containing computer executable instructions of claim 10, wherein the portion of content selected by the user is matched according to a relevance score, and the relevance score is determined using a subset of: matching relevance to past portions of content selected by one or more users; matching relevance of the user making the selection of the content portion to the one or more other users; matching relevance of the content portion selected by the user with historical usage by the one or more users; matching the portion of content exactly to the user selected content portion.

15. A non-transitory computer-readable medium having stored thereon, a set of computer-executable instructions for causing a computer to perform instructions on a web browser, without requiring a user of the computer to install an additional software component, comprising:
  instructions for executing a highlighting functionality, comprising:
    instructions for receiving a request for an internet document;
    instructions for serving the internet document to the web browser;
    instructions for displaying the internet document in the web browser;
    instructions for enabling a user to select a content portion within the displayed internet document;
    instructions for automatically identifying content portions within the displayed internet document matching the content portion selected by the user;
    instructions for generating and displaying a highlight on at least one content portion matching the content portion selected by the user within the displayed internet document.

16. The non-transitory computer-readable medium of claim 15, wherein the computer-readable medium enables the user to display highlights that represent at least a consolidation or a subset of user selected content portions made by other users, on the displayed internet document.

17. The non-transitory computer-readable medium of claim 15, wherein a web portal provides the user with access to a subset of previously selected content portions by a specific user.

18. The non-transitory computer-readable medium of claim 15, wherein the portion of content selected by the user is tracked and stored in a storage medium.

19. The non-transitory computer-readable medium for highlighting and identifying of claim 15, wherein the non-transitory computer-readable medium allows discovery of related content portions as selected by other users.

20. The non-transitory computer-readable medium of claim 15, wherein the user's computer executes instructions to match the content portions selected by the user with other matching content portions in the displayed internet document.

21. The non-transitory computer-readable medium of claim 15, wherein
  the computer is a wide variety of computing devices, including but not limited to a desktop computer, a laptop computer, a personal digital assistant, a hand-held computer, a mobile handset, a wireless telephone, a wearable computer, or a thread/process running on these devices, and/or objects executable by these devices;
  the web browser is a software application bundle as distributed by the developer of the application and the web browser is utilized to view one or more internet documents; and
  the internet document is a document that is available for viewing using the Internet.

* * * * *